United States Patent
Goetz et al.

(10) Patent No.: US 9,524,152 B2
(45) Date of Patent: Dec. 20, 2016

(54) PARTIAL SPECIALIZATION OF GENERIC CLASSES

(71) Applicant: Oracle International Corporation, Redwood City, CA (US)

(72) Inventors: Brian Goetz, Williston, VT (US); John R. Rose, San Jose, CA (US); Alexander R. Buckley, Cupertino, CA (US)

(73) Assignee: Oracle International Corporation, Redwood City, CA (US)

( * ) Notice: Subject to any disclaimer, the term of this patent is extended or adjusted under 35 U.S.C. 154(b) by 50 days.

(21) Appl. No.: 14/692,592

(22) Filed: Apr. 21, 2015

(65) Prior Publication Data

US 2015/0301807 A1    Oct. 22, 2015

Related U.S. Application Data

(60) Provisional application No. 61/982,802, filed on Apr. 22, 2014.

(51) Int. Cl.
*G06F 9/45*     (2006.01)
*G06F 9/445*    (2006.01)
*G06F 9/44*     (2006.01)

(52) U.S. Cl.
CPC .............. *G06F 8/443* (2013.01); *G06F 8/315* (2013.01); *G06F 8/437* (2013.01); *G06F 8/70* (2013.01);
(Continued)

(58) Field of Classification Search
CPC ....................................................... G06F 8/24
(Continued)

(56) References Cited

U.S. PATENT DOCUMENTS 5,628,016 A    5/1997   Kukol
5,677,312 A    10/1997  Kon et al.
(Continued)

FOREIGN PATENT DOCUMENTS

WO    2004102303    11/2004

OTHER PUBLICATIONS

"Generics and Templates (Visual C++)"; Microsoft Developer Network website (msdn.microsoft.com) as captured by the Wayback Machine Internet Archive (archive.org) on Mar. 20, 2014.*
(Continued)

*Primary Examiner* — Qing Chen
*Assistant Examiner* — Clint Thatcher
(74) *Attorney, Agent, or Firm* — Robert C. Kowert; Meyertons, Hood, Kivlin, Kowert & Goetzel, P.C.

(57) ABSTRACT

Generic classes may have more than one specializable type parameter and it may be desirable to specialize one or more of the type variables while not specializing others. The result of partial specialization may be one or more additional generic classes that are further specializable on the remaining type parameters. A runtime specializer may partially specialize a generic class to produce a partially specialized class and may subsequently further specialize the partially specialized class to generate a fully specialized class. Thus, rather than performing the specialization of a generic class all at once, such as by specializing Map<K, V> into Map<int, int> or Map<long, int>, one type parameter may be partially specialized, such as resulting in Map<K, int>, and then at some later time the remaining type parameter(s) may be specialized, such as to generate Map<int, int> or Map<long, int>.

20 Claims, 17 Drawing Sheets

(52) U.S. Cl.
CPC .............. *G06F 8/71* (2013.01); *G06F 9/4428* (2013.01); *G06F 9/4433* (2013.01); *G06F 9/44521* (2013.01); *G06F 8/24* (2013.01)

(58) Field of Classification Search
USPC ....................................................... 717/140
See application file for complete search history.

(56) References Cited

U.S. PATENT DOCUMENTS

| | | | |
|---|---|---|---|
| 5,923,878 | A | 7/1999 | Marsland |
| 6,279,008 | B1 | 8/2001 | Tung Ng et al. |
| 6,360,360 | B1 | 3/2002 | Bates et al. |
| 6,513,152 | B1 | 1/2003 | Branson et al. |
| 6,757,890 | B1 | 6/2004 | Wallman |
| 7,000,219 | B2 | 2/2006 | Barrett et al. |
| 7,162,716 | B2 | 1/2007 | Glanville et al. |
| 7,530,051 | B1 * | 5/2009 | Allen .................. G06F 8/10 717/107 |
| 7,571,430 | B2 * | 8/2009 | Trimbell ................ G06F 8/70 717/140 |
| 8,079,023 | B2 | 12/2011 | Chen |
| 8,250,528 | B2 | 8/2012 | Meijer et al. |
| 8,438,551 | B2 | 5/2013 | Tonkin et al. |
| 8,863,079 | B2 | 10/2014 | Darcy et al. |
| 2002/0032900 | A1 | 3/2002 | Charisius et al. |
| 2003/0018958 | A1 | 1/2003 | Wallman et al. |
| 2003/0079049 | A1 | 4/2003 | Sokolov |
| 2003/0079201 | A1 | 4/2003 | Sokolov |
| 2004/0006762 | A1 | 1/2004 | Stewart et al. |
| 2004/0221228 | A1 | 11/2004 | Day et al. |
| 2005/0055682 | A1 | 3/2005 | Gadre et al. |
| 2005/0193269 | A1 | 9/2005 | Haswell et al. |
| 2006/0048024 | A1 | 3/2006 | Lidin et al. |
| 2006/0143597 | A1 | 6/2006 | Alaluf et al. |
| 2006/0251125 | A1 | 11/2006 | Goring et al. |
| 2007/0256069 | A1 | 11/2007 | Blackman et al. |
| 2008/0033968 | A1 | 2/2008 | Quan et al. |
| 2008/0040360 | A1 | 2/2008 | Meijer et al. |
| 2008/0154950 | A1 * | 6/2008 | Gross .................. G06F 9/4428 |
| 2008/0275910 | A1 | 11/2008 | Molina-Moreno et al. |
| 2008/0294740 | A1 | 11/2008 | Grabarnik et al. |
| 2009/0271771 | A1 | 10/2009 | Fallows |
| 2010/0223606 | A1 | 9/2010 | Park et al. |
| 2011/0067013 | A1 | 3/2011 | Frost et al. |
| 2012/0005660 | A1 | 1/2012 | Goetz et al. |
| 2013/0305230 | A1 | 11/2013 | Inoue |
| 2014/0068574 | A1 * | 3/2014 | Naden .................. G06F 8/31 717/140 |

OTHER PUBLICATIONS

Vladimir Batov; "Java Generics and C++ Templates"; Dr. Dobbs sowftware development website (www.drdobbs.com); Jul. 1, 2004.*
"Understanding C++ Partial Template Specialization"; Stack Overflow website (stackoverflow.com); May 26, 2011.*
International Search Report and Written Opinion from PCT/US2015/026966, Date of Mailing Sep. 1, 2015, Oracle International Corporation, pp. 1-11.
Martin J. Cole, et al., "Dynamic compilation of C++ template code", Scientific Programming vol. 11, No. 4, Jan. 1, 2003, pp. 321-327.
Eyvind W. Axelsen, et al., "Groovy Package Templates", Proceeding of the 5th Symposium on Dynamic Languages, Oct. 26, 2009, pp. 15-26.
Lubomir Bourdev, et al., "Efficient run-time dispatching in generic programming with minimal code bloat", Science of Computer Programming, vol. 76, No. 4, Apr. 1, 2011, pp. 243-257.
Brian Goetz, "ClassDynamic Jun. 2014: Initial Draft", Retrieved from the Internet: URL: http://web.archive.org/web/20140801102025/http://cr.openjdk.java.net/briangoetz/valhalla/spec-classdyn.html, Jun. 2014, pp. 1-3.
International Search Report and Written Opinion from PCT/US2015/026947, Date of Mailing Jul. 6, 2015, Oracle International Corporation, pp. 1-11.
Eric Allen, et al., "Efficient Implementation of Run-Time Generic Types for Java", Mar. 3, 2006, Retrieved from the Internet: URL: http://web.archive.org/web/20060303102205/http://www.cs.rice.edu/javaplt/paper/wcgp2002.pdf, pp. 1-28.
Robert Cartwright, et al., "Compatible Genericity with Run-Time Types for the Java Programming Language", Principles of Programming Languages, ACM, Oct. 1, 1998, pp. 201-215.
Joseph A. Bank, et al., "Parameterized Types and Java", May 1996, Retrieved from the Internet: URL: http://publications.csail.mit.edu/lcs/pubs/pdf/MIT-LCS-TM-553.pdf, pp. 1-19.
International Search Report and Written Opinion from PCT/US2015/026965, Oracle International Corporation, dated Nov. 6, 2015, pp. 1-11.
Gamma E et al: "Design Patterns: Elements of Reusable Object-Oriented Software", Sep. 1, 1999, pp. 81-228, XP882287989, p. 175-p. 184.
Julian Dragos et al: "Compiling generics through user-directed type specialization", Proceedings of the 4th Workshop on the Implementation, Compilation, Optimization of Object-Oriented Languages and Programming Systems, ICOOOLPS '09, Jul. 6, 2009, pp. 42-47, XP055195664, New York, New York, USA DOI: 10.1145/1565824.1565830, ISBN: 978-1-60-558541-3, p. 43-p. 46.
Martin Buchi et al: "Generic Wrappers" In: "Advances in Communication Networking: 20th EUNICE/IFIP EG 6.2, 6.6 International Workshop, Rennes, France, Sep. 1-5, 2014, Revised Selected Papers", May 12, 2000, Springer Verlag, DE 032548, XP055223226, ISSN: 0302-9743, ISBN: 978-3-642-36699-4, vol. 1850, pp. 201-225, DOI: 10.1007/3-540-45102-1 10, p. 202-p. 219.
Evered M et al: "Genja-a new proposal for parameterised types in Java", Technology of Object-Oriented Languages and Systems, 1997. Tools 25, Proceedings Melbourne, Vic., Australia Nov. 24-28, 1997, Los Alamitos, CA, USA,IEEE Comput. SOC, US, Nov. 24, 1997, pp. 181-193, XP010286322, ISBN: 978-0-8186-8485-2 p. 182-p. 188.
International Search Report and Written Opinion in PCT/US2015/026962, Date of Jul. 2, 2015, Oracle International Corporation, pp. 1-12.
Andrew Myers, et al., "Parameterized Types for Java", Conference Record of POPL '97: 24th ACM SIGPLANSIGACT Symposium on Principles of Programming Language, Jan. 15-17, 1997, pp. 132-145.
Atanas Radenski, et al., "The Java 5 Gererics Comprise Orthogonality to Keep Compatibility", Journal of Systems & Software, Nov. 1, 2008, pp. 2069-2078, vol. 81, No. 11.
Brian Goetz, "State of the Specialization", Retrieved from the Internet: http://web.archive.org/web/20140717190322/http://cr.openjdk.java.net/briangoetz/valhalla/specialization.html, pp. 1-7.
"Templates, C++ FAQ", Jan. 15, 2014, Retrieved from the Internet: URL:http://web.archive.org/web/20140115082944/http://isoccp.org.wiki/faq/templates, pp. 2-27.
U.S. Appl. No. 14/660,143, filed Mar. 17, 2015, Brian Goetz et al.
U.S. Appl. No. 14/660,177, filed Mar. 17, 2015, Brian Goetz et al.
U.S. Appl. No. 14/660,604, filed Mar. 17, 2015, Brian Goetz et al.
Nystrom et al., "Genericity through Constrained Types", 2009, IBM Watson Research Center, 18 pages.
Shailendra Chauhan, "Difference Between Generalization and Specialization", 2013, retrieved from http://www.dotnet-tricks.com/Tutorial/oops/169c211013-Difference-Between-Generalization-and-Specialization.html, 6 pages.
Kiezun et al., "Refactoring for Parameterizing Java Classes", IEEE, 2007, pp. 1-10.
Ernst, "Inheritance versus Parameterization", ACM, 2013, pp. 26-29.
Sunil Soman, et al., "Efficient and General On-Stack Replacement for Aggressive Program Specialization", 2006 International Conference on Programming Languages and Compilers (PLC'06), Jun. 26-29, pp. 1-9, Las Vegas, NV.
Peter Kajas, et al, "Design Pattern Instantiation Directed by Concretization and Specialization", ComSIS, Jan. 2011, pp. 41-72, vol. 8, No. 1.
"Common Language Infrastructure (CLI) Partitions I to VI", ECMA International, Jun. 2012, pp. 1-548, Standard ECMA-335, 6th Edition.

(56) References Cited

OTHER PUBLICATIONS

Gilad Bracha, "Generics in the Java Programming Language", Jul. 5, 2004, pp. 1-23.
Michael Johnson, "New Features of C#", CSCI 5448, 2012, p. 5.
Alessandro Warth, et al., "Statically Scoped Object Adaptation with Expanders", ACM OOPSLA'06, Oct. 22-26, 2006, pp. 1-19.
U.S. Appl. No. 14/692,590, filed May 21, 2015, Brian Goetz et al.
U.S. Appl. No. 14/692,593, filed May 21, 2015, Brian Goetz et al.
U.S. Appl. No. 14/692,601, filed May 21, 2015, Brian Goetz et al.

* cited by examiner

PARTIAL SPECIALIZATION OF GENERIC CLASSES

PRIORITY INFORMATION

This application claims benefit of priority to the following provisional application, which is hereby incorporated by reference in its entirety: U.S. Ser. No. 61/982,802 filed Apr. 22, 2014 titled Specializing Parametric Types with Primitive Type Arguments.

This application is related to the following application, which is hereby incorporated by reference in its entirety: U.S. Ser. No. 14/660143 filed Mar. 17, 2015 titled Metadata-driven Dynamic Specialization.

This application is related to the following application, which is hereby incorporated by reference in its entirety: U.S. Ser. No. 14/660177 filed Mar. 17, 2015 titled Structural Identification of Dynamically Generated, Pattern-Based, Classes.

This application is related to the following application, which is hereby incorporated by reference in its entirety: U.S. Ser. No. 14/660604 filed Mar. 17, 2015 titled Decomposing a Generic Class into Layers.

BACKGROUND

The present invention relates generally to software development and more specifically to various aspects of language development within any of various programming languages, such as a platform-independent, object-oriented programming language, as one example.

In various programming languages, parametric polymorphism (e.g., generics) may be considered as a way to make a language more expressive, while still maintaining full static type-safety. Parametric polymorphism may allow a function or a data type to be written in a generic fashion such that it can handle various data types in the same manner regardless of their different types. Such functions and data types may be called generic functions and generic datatypes. For example, a generic list class may be written List<T>, which means that it can be a list of elements of any type T, where T is specified separately from the specification of List.

Frequently, when using object oriented languages that do not provide a single type which can be a supertype for all other types, one cannot generify over primitive certain types without using particular conversion operations, such as boxing (e.g., automatically converting a value of a primitive type, like int, into an object of a corresponding wrapper class like Integer). For example, traditionally the Java™ language does not allow generics over both objects and primitives.

Parametric polymorphism (generics) may also involve a tradeoff between code size, generation costs and type specificity. For example, a programming language may support primitive-specialized generics, but may generates specialized classes statically, thereby at potentially increased cost to code footprint and compilation cost. Another programming language may generate a specialized instantiation of templates for each instantiation used by the program, which may result in a large static footprint. Yet a third language may use a templatized bytecode format, only performing specialization to runtime, which may require an additional step before using a generic class file, thereby potentially harming runtime performance.

SUMMARY

Generic classes may have more than one specializable type parameter and it may be desirable to specialize one or more of the type variables while not specializing others, (e.g. leaving others erased). In some embodiments, the result of partial specialization may be one or more additional generic classes that are further specializable on the remaining type parameters. A specializer may partially specialize a generic class and subsequently further specialize the partially specialized class to generate fully specialized class, according to some embodiments.

Thus, rather than performing the specialization of a generic class all at once, such as by specializing Map<K, V> into Map<int, int> or Map<long, int>, one type parameter may be partially specialized, such as resulting in Map<K, int>, and then at some later time the remaining type parameter(s) may be specialized, such as to generate Map<int, int> or Map<long, int>.

DETAILED DESCRIPTION OF EMBODIMENTS

Figure 1:
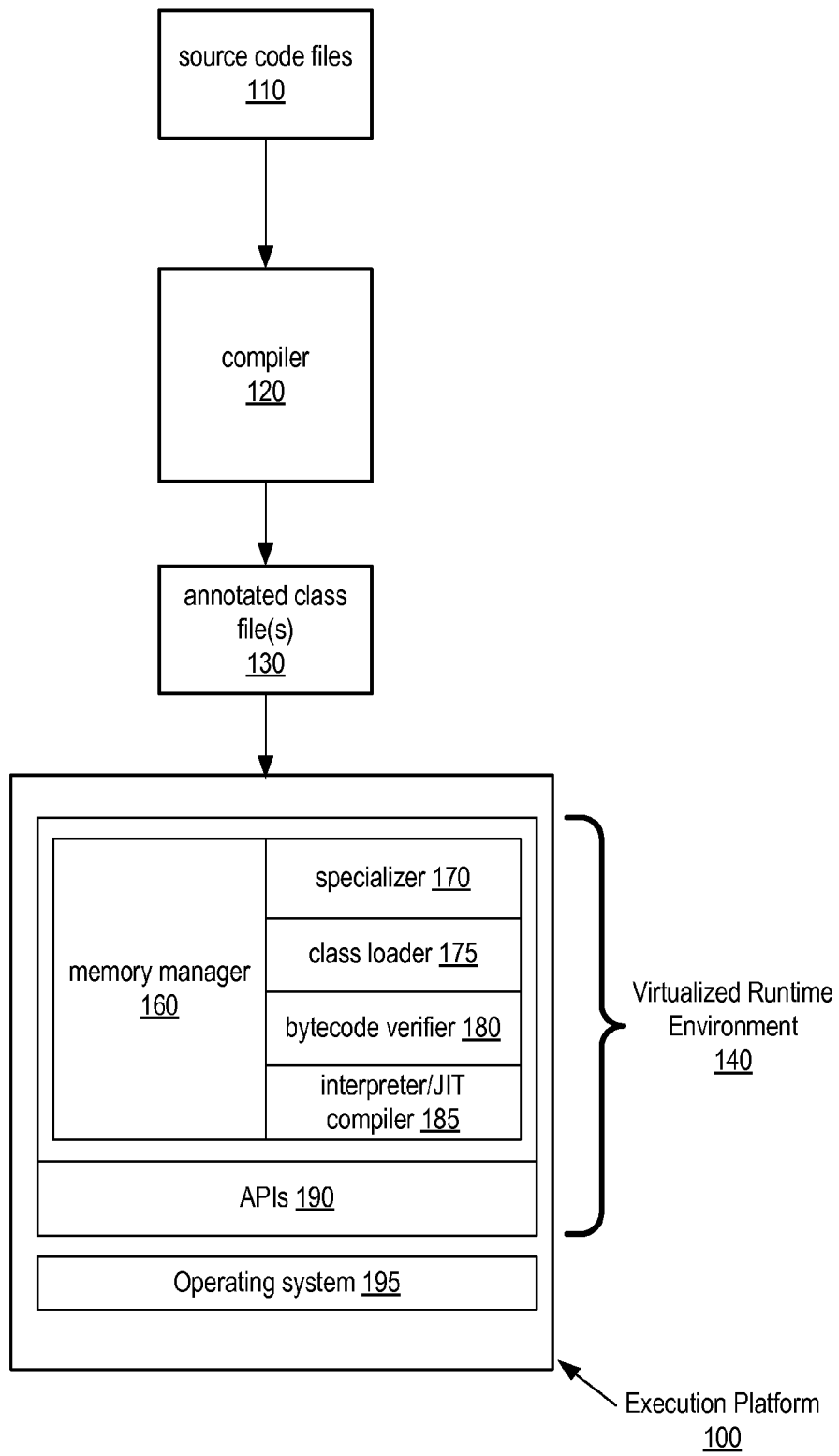
FIG. 1 is a logical block diagram illustrating component of a system implementing dependency-driven co-specialization of specialized classes, according to one embodiment.

Described herein are various embodiments of enhancements to software development using a platform-independent, object oriented language, such as the Java™ programming language, to support various features related to specialization of generic types, classes and methods.

For instance, the loading or operation of a specialized class may trigger the specialization of other classes. For example, if a first class extends a particular superclass, the specialization of the first class may trigger the specialization of the superclass. Additionally, specializing a class may trigger the specialization of various classes used internally as part of the implementation of the class. According to one embodiment, a compiler may be configured to recognize dependency relationships between generic classes and to describe the classes in terms of the type variables of the triggering types (e.g., the types and/or type parameterizations) that trigger the specialization of other classes based on the specialization of a first class.

A compiler may include references (e.g., structural references) indicating dependency relationships between classes when generating class files. For instance, in one embodiment, a compiler may be configured to write out (e.g., to a class file) a description of a generic supertype in terms of a type variable of the generic subtype. Thus, in some embodiments, the class file may include information (e.g., metadata and/or a description) indicating a dependency relationship between a class and another class. Loading a first class may trigger the loading of a second class based on the dependency relationship. Additionally, there may be multiple levels of dependency and specializing of one classes may trigger the specialization of multiple other classes, which in turn may trigger the specialization of yet other classes, according to various embodiments.

Additionally, generic classes may have more than one specializable type parameter and it may be desirable to specialize one or more of the type variables while not specializing others, (e.g. leaving others generic). In some embodiments, the result of partial specialization may be one or more additional generic classes that are further specializable on the remaining type parameters. A specializer executing during runtime may be configured to partially specialize a generic class (e.g., to produce a partially specialized class) and to subsequently further specialize the partially specialized class to generate fully specialized class, according to some embodiments. Thus, rather than performing the specialization of a generic class all at once, such as by specializing Map<K, V> into Map<int, int> or Map<long, int>, one type parameter may be partially specialized, such as resulting in Map<K, int>, and then at some later time the remaining type parameter(s) may be specialized, such as to generate Map<int, int> or Map<long, int>.

While a runtime specializer may always be able to generate an automated specialized version of a generic class, in some cases an alternate form of user control over specialization may allow the use of automated specialization while also adding (or overriding) specialization-specific method implementations. In general, the set of members of a generic class may not change when the class is specialized. In other words, the same members may exist in the auto-specialized version as in the generic version. However, manual refinement of specialized classes may allow a developer to hand specialize a particular (possibly a better) representation and/or implementation of the specialized class. Alternate, as well as additional, methods, data layouts, fields, etc. may vary between the original generic class (as well as an auto specialized version of the generic class) and the replacement class, according to various embodiments. Thus, in some embodiments, replacement versions of classes, methods, fields, etc., may be provided for a generic class while maintaining the same interface and representation, while in other embodiments an entirely different representation (e.g., different and/or additional methods, data layout, fields, etc.) may be provided for particular specializations of a generic class.

For example, a generic class List may be generic in any T and the auto specialized versions of List may include all the fields and methods of the generic version, but if List is specialized for T=int, a new version of a particular one of the class methods may also be included in the specialized class. Thus, if List is specialized for T=int, the hand specialized version of the method may be used in place of the auto specialized version, according to some embodiments. Manual refinement of specialized class may include utilizing different versions of method to override existing or auto specialized versions of the methods. Additionally, manual refinement may also include including additional methods in a specialized class only for particular (and not other) type parameterizations. Thus, a refinement method may be included in a specialized class only when the corresponding generic class is specialized for a particular type parameterization.

Furthermore, specialization may include providing replacement classes for generic classes. Wholesale replacement of specialized classes may involve the ability to replace the auto specialization of a generic class with a replacement class. The auto specialized version of the class may not be used at all and instead, a completely different, hand-written, class may be used when the class is specialized for particular type parameterizations, according to some embodiments. In some embodiments, alternate, hand-written, specializations of a class may be used (and/or required) at the time that the generic class is compiled. In other embodiments, however, alternate (e.g., replacement or refinement) specializations of the generic class may be utilized after the class is compiled (e.g., either before or at the time the generic class is specialized).

Additionally, a replacement class may have the same interface as the generic or auto specialized version, but it may have a completely different representation and/or implementation. In some embodiments however, the replacement class must have (e.g., may be required to have) the same interface as the generic or auto specialized version. For instance a replacement class not having the all the methods (e.g., all the non-private methods) of the base class (and therefore of an auto specialized version of the class) may cause in an error, according to some embodiments.

In some embodiments, the replacement class may be required to have (at least) all the same methods that the generic or auto specialized versions of the class would have (e.g., so that the alternate version of the class respects the Liskov Substitution Principle). A runtime environment may load the alternate version of the class whenever the particular specialization is instantiated. The generic or auto specialized version of the class may include information identifying the alternate version of the class and indicating which type parameterizations may trigger use of the alternate version.

Alternatively, information identifying the alternate version of the class and indicating which type parameterizations may trigger use of the alternate version may be stored somewhere other than within the generic or auto specialized version of the class, such as in the class file or in an information registry, and thus the runtime may not have to load the generic or auto specialized version of the class when using the alternate version of the class.

In the following detailed description, numerous specific details are set forth to provide a thorough understanding of claimed subject matter. However, it will be understood by those skilled in the art that claimed subject matter may be practiced without these specific details. In other instances, methods, apparatuses or systems are not described in detail below because they are known by one of ordinary skill in the art in order not to obscure claimed subject matter.

While various embodiments are described herein by way of example for several embodiments and illustrative drawings, those skilled in the art will recognize that embodiments are not limited to the embodiments or drawings described. It should be understood that the drawings and detailed description thereto are not intended to limit the embodiments to the particular form disclosed, but on the contrary, the intention is to cover all modifications, equivalents and alternatives falling within the spirit and scope of the disclosure. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Turning now to FIG. 1 which illustrates a workflow for compiling and executing a computer program specified in a high-level, platform independent, object-oriented language that supports primitive and reference data types, and various methods, features and enhancements regarding specializations of generic classes and/or methods, as described herein, according to various embodiments. For purposes of illustration, the following description is provided largely in the context of using the Java™ programming language. However, it is noted that the techniques described may be used with virtually any object-oriented programming language that supports multiple kinds of types (such as primitive types, reference types, record types, union types, etc.) and specialization thereof in appropriate contexts.

According to the illustrated embodiment, the workflow may begin when a compiler, such as compiler 120, may be implemented on one or more computing devices and may receive source code for a computer program, such as source code 110. In various embodiments, source code 110 may be specified in various high-level and/or platform independent, object-oriented programming languages, such as Java™ and/or other languages. For example, source code may be provided as a set of .java files in embodiments where Java™ is being used. In some embodiments, source code 110 may be specified using a combination of languages, which may include one or more low-level and/or intermediate languages (e.g., assembly). In some embodiments, at least some of the source code may initially be written in a dynamically-typed high-level language, such as Python or Ruby, while in other embodiments, all of the source code may be in a statically-typed language such as Java™.

In general, a class may be considered a user-defined type or data structure that may include data, variables, functions, methods and/or other attributes as members and that represents a definition, blueprint, or template, for creating programming objects of a specific type. A class may provide initial values for data members and implementations for member functions and methods. Classes are frequently included in libraries. A library may be considered a collection of resources used by software programs or applications. A library may include any of various types of resources including, but not limited to, data, documentation, classes, subroutines, and/or type specifications, according to some embodiments. A library may be organized so as to be utilized by more than one application (possibly at the same time), and may promote re-usability by providing resources so that applications may not have to implement (or re-implement) the same behavior.

The compiler 120 may analyze the source code 110 to produce an executable version of the program or bytecode files, such as annotated class file(s) 130 (e.g., .class files or .jar files in the case of Java™) in the depicted embodiment. Different types of executable code formats may be used in various embodiments; for example, binary machine language may be used instead of bytecodes. In some scenarios, parts of the executable code (e.g., annotated class files 130) may be in bytecode while others are in a native binary machine language.

As part of compiling program source code 110 into executable code (e.g., annotated class files 130), the compiler 120 may perform a sequence of analysis operations and generate various intermediate data structures before generating the executable version, such as to apply or implement specialization, according to some embodiments. For example, the compiler may apply a type erasure operation using an encoded (annotated or decorated) form of a program element in a generic class, thus created annotated class file 130. As noted above, the encoded form of the program element may include metadata indicating which type variables of the class (or method) declaration have been erased and which types are the erasures of type variables.

In some embodiments, a compiler, such as compiler 120 may retain certain types of information that traditionally may not have been retained during the compilation process. For example, in one embodiment, compiler 120 may retain information utilized as part of performing an erasure. The compiler may include (at least part of) such information in the annotated class file 130 as metadata regarding specialization.

For instance, a type erasure operation may be applied using an encoded (or annotated) form of a program element in a generic class. The program element may represent a class signature or declaration, a method signature or declaration, an instruction, an argument to an instruction, as well as virtually any program element that represents, moves, or manipulates data.

The encoded form of the program element may include metadata indicating which type variables of the class (or method) declaration have been erased and which types are the erasures of type variables. Additionally, the metadata may include various types of specialization-related information. For example, the metadata may indicate that an instruction operates on values of the type variables of a class (or method declaration). Similarly, the metadata may indicate that an argument indicates types that are erasures of the type variables of the class or method declaration.

The metadata in an annotated class file may include specialization information indicating which type variables have been erased and which types are the erasures of type variables, according to some embodiments. Type erasure pertains to the use of generics within a programming language (e.g., the Java language). When performing a type erasure operation, a compiler may be configured to replace all type parameters in generics types with their bounds or with an Object type if the type parameters are unbounded. The generated bytecode may thus contain only ordinary classes, interfaces and methods.

Additionally, structural descriptions may be utilized to extend the way classes are described in a runtime environment. Instead of describing classes only by name, and using that name to locate that class (e.g., in a class file on disk), a class may be referred to as a combination of a code generator function and possibly some arguments. In other words, in some embodiments, a class may be described by a structural description specifying a generator function and possibly one or more parameters to that generator function. A structural description may, in some embodiments, be considered (e.g., may be used instead of) a class name for virtually any situation in which a class name may be used (e.g., argument type, return type, field type, supertype, operand of instance of or cast operator, etc.).

Thus, in some embodiments, a compiler and/or virtualized runtime environment may be configured to allow descriptions of classes using structural descriptions. For example, dependency relationships between classes (e.g., superclass/subclass relationships) may be described using structural descriptions. According to some embodiments, the structural identification of classes may be utilized using structural descriptions, such as to extend the way classes are described in a runtime environment. A structural description of a class may appear anywhere a class name could otherwise appear in a purely nominal VM (e.g., a VM not configured to support structural descriptions as class names), according to some embodiments. For example, a structural description of a class may appear as, or in place of, an argument type, a return type, a field type, a supertype, an operand of instance of or a cast operator, and generally anywhere a class name may be used.

As illustrated in FIG. 1, annotated class file 130 may be passed to an execution environment, such as virtualized runtime environment 140, which executes the code on an execution platform 100, thereby creating various output data and/or behavior. The virtualized runtime environment 140 may in turn comprise a number of different components, such as memory manager 160, specializer 170, class loader 175, bytecode verifier 180 (e.g., to check the validity of the executable code), and/or an interpreter and/or just-in-time (JIT) compiler 185, according to various embodiments. The JIT compiler may in some embodiments be responsible for translating some or all of the bytecode (for example, heavily-used portions of bytecode) into platform-specific machine code to improve performance of the program execution. A virtualized runtime environment 140 may also include code to implement a number of application programming interface (API) libraries 190 in some embodiments. The virtualized runtime environment 140 may run on top of lower-level software such as an operating system 195 in some embodiments.

In different embodiments, the output or behavior produced as a result of the execution of the compiled code may include data stored in various levels of system memory (e.g., in-memory objects and/or data structures), on persistent storage (e.g., files on a file system), etc. The behavior may also include various program functionalities, such as displaying output on a screen, sending messages over a network, and/or otherwise interacting with various users and/or components.

In some embodiments, virtualized runtime environment 140 may use the annotated class file(s) 130 generated by compiler 120. According to some embodiments, virtualized runtime environment 140 may, when loading a class to be specialized with a particular parameterization, use annotated class file 130 as a template (along with the parameters with which to specialize) and may produce a new class which is the particular specialization of the class being specialized. For example, when specializing a class, a set of type parameters may be part of the input to the specialization (e.g., List<any T> may be specialized using T=int as a parameter to obtain List<int>). In general, an annotated class file 130 may be considered a class file marked up with specialization related metadata. Furthermore, an annotated class file 130 may be turned into a new class that is a specialization of the annotated class, according to various embodiments.

Dependency-Driven Co-Specialization of Specialized Classes

According to some embodiments, the loading or operation of a specialized class may trigger the specialization of other classes. For example, if "class ArrayList<T> extends AbstractList<T>", the instantiation of ArrayList<int> may require resolution of AbstractList<int>. Similarly, given a class Map<keyType, ValueType> that includes internally, as part of its implementation, a class representing a map's node, that class would also be a generic in the keyType and the valueType. Using dependency driven co-specialization, when the generic class Map<keyType, valueType> is instantiated as a map from int to long (e.g., Map<int, long>), the specialized implementation of Map<int, long> may then trigger the specialization of dependent type(s), such as the internal node class mentioned above, according to some embodiments.

Thus, according to some embodiments, a compiler, such as compiler 120, may recognize dependency relationships between generic types and may describe the dependent types in terms of the type variables of the triggering types (e.g., the types that trigger the specialization of the dependent types). For example, when the compiler writes out a class file, instead of writing/doing everything nominally, such as when ArrayList<T> gets erased to just ArrayList so that ArrayList extends List, as in done in legacy compilers, a compiler configured to implement dependency-driven co-specialization may include structural references indicating dependency relationships in the class file.

For example, if ArrayList extends List, rather than just using the name List, the compiler may utilize a structural description referring to the, e.g., "the class resulting from applying a specialization transform to List with the type parameter T." In other words, the compiler 120 may be configured to write out (e.g., to a class file) a description of a generic supertype in terms of a type variable of the generic subtype. Thus, the class file may include a description indicating that class ArrayList<T> extends the class resulting from applying the specialization code generator to the argument (e.g., T). Loading ArrayList may trigger the loading of List and List may be described by a structural description such that the specializer (and/or class loader) may apply the structural description to generate the class List for the particular parameterization of T and load it into the runtime cache. Thereafter, List may be usable to be extended, such as by ArrayList.

In the structural description of the superclass (e.g., in an example of ArrayList<T> extends List<T>), the type variable T from ArrayList appears in the structural description of the supertype, so that when ArrayList<T> is specialized for T=int, the occurrence of T in the structural description of the supertype is replaced with int, according to one embodiment. Thus, the type parameter for T as declared within ArrayList gives meaning to occurrences of "T" in the "extends" clause and in the body of ArrayList. When the class is generated, class ArrayList<int> may extend the class resulting from applying the specialize transform of List to int and that may trigger the loading of List<int>, resulting in having ArrayList<int> extend List<int>.

According to some embodiments, the type parameter T, when declared between the "<>", introduces a type variable T, similar to the manner in which a formal parameter declared between the " " of a method introduces a variable. The type variable T may be used in the signature of the generic class (e.g., as in an "extends" clause) as well as in the body of the generic class (e.g., as in the type of a field). Within the signature of the generic class the type variable T may appear in a type argument position (e.g., "extends AbstractList<T>") but may not appear in a top level position (e.g., "extends T"), according to some embodiments. However, within the body of a generic class, the type variable T may appear in a type argument position (e.g., as a field declaration, such as "List<T> f ;") as well as in a top level position (e.g., as a field declaration, such as "T f ;"). Co-specialization may be triggered whenever the type variable T is used in a type argument position, according to some embodiments.

At runtime the specialization of one type (or class) may trigger the specialization of other types. For example, if an implementation of Foo<T> refers to Bar<T>, the specialization of Foo may trigger the specialization of Bar (e.g., because Bar may be required to complete the specialization of the code for Foo), according to some embodiments. The runtime environment, such as virtualized runtime environment 140 may recognize the dependency relation using any of various types of information, such as by using the information about the dependent types included in the class file by the compiler.

Figure 2:
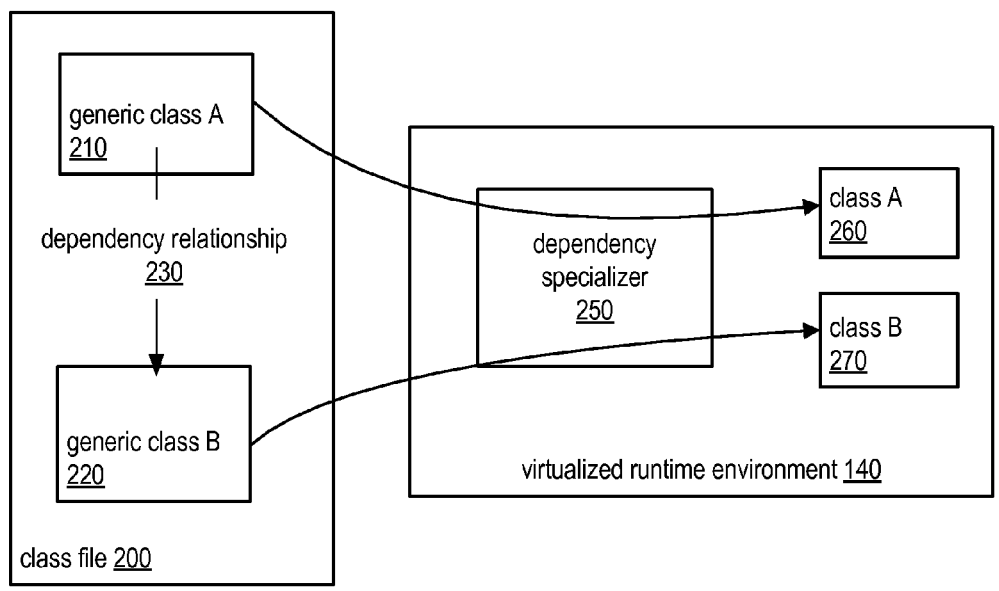
FIG. 2 is a logical block diagram illustrating dependency-driven, co-specialization, according to one embodiment.

Turning now to FIG. 2, which is a logical block diagram illustrating one example embodiment of dependency-driven co-specialization of specialized classes, as described herein. As shown in FIG. 2, class file 200 may include generic class A 210 and generic class B 220, which have a dependency relationship 230. For example, in one embodiment, class A may be dependent upon class B. When dependency specializer 250 specializes class A to generate class A 260, such as upon instantiation of class A for a particular type parameterization, dependency specializer 250 may determine (e.g., recognize) the dependency relationship between class A and class B and may therefore also specialize class B to generate class B 270, according to some embodiments. Thus, the dependency relationship 230 between generic class A 210 and generic class B 220 may trigger the specialization of class B whenever class A is specialized.

From the developer's perspective, the co-specialization simply occurred automatically (e.g., without any particular command by the developer) based on the dependency relationship between the different types (or classes).

Figure 3:
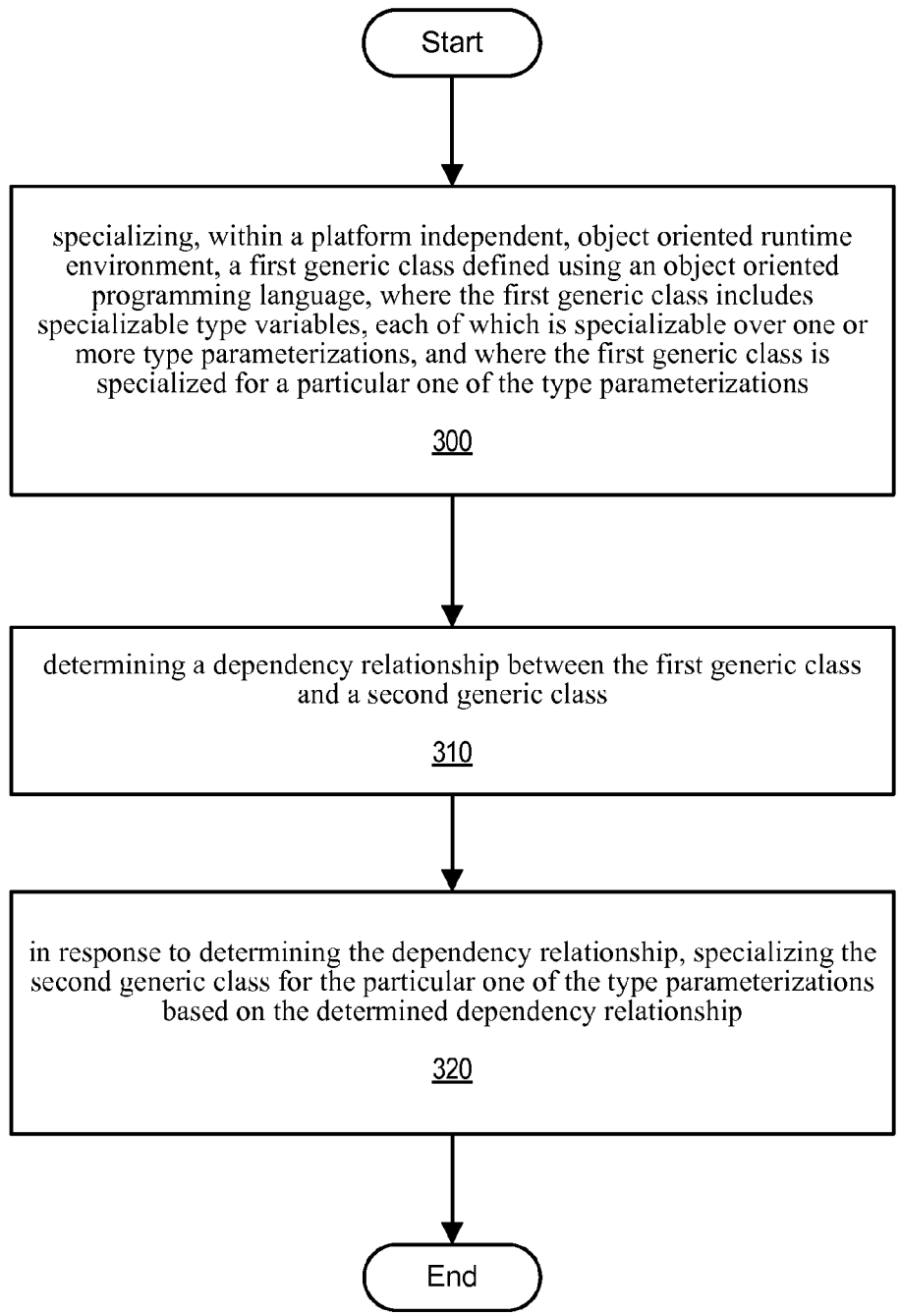
FIG. 3 is a flowchart illustrating one embodiment of a method for dependency-driven, co-specialization, as describe herein.

FIG. 3 is a flowchart illustrating one embodiment of a method for dependency-driven co-specialization of specialized classes, as described herein. As shown in block 300, a method for implementing dependency-driven co-specialization may include specializing, within a platform independent object oriented runtime environment, a first generic class defined using an object oriented programming language. The first generic class may comprise one or more specializable type variables and each of the one or more type variables may be specializable over one or more type parameterizations. Furthermore, the first generic class may be specialized for a particular one of the type parameterizations.

For instance, as described above, generic class A 210 defined in class file 200 may be instantiated for a particular type parameterization. Thus, the generic class may be specialized within virtual runtime environment 140 (e.g., within a platform independent object oriented runtime environment) for that particular type parameterization.

According to one example embodiment, a Java-based class ArrayList<T> may be specialized for type int. Thus, the generic class ArrayList may be specialized within a Java-based virtual machine for T=int, according to the example embodiment.

As shown in block 310, a dependency relationship may be determined between the first generic class and a second generic class, according to some embodiments. For example, a specializer of the runtime environment, such as specializer 170 and/or dependency specializer 250 of virtualized runtime environment 140, may be configured to determine dependency relationships between two classes, such as dependency relationship 230 between between generic class A 210 and generic class B 220 illustrated in FIG. 2, described above.

The dependency between two classes may involve (e.g., be created or triggered) by virtually any type-use of a type or class B within a class A, according to various embodiments. For instance, a dependency relationship may involve (or be defined/created by) the use of a supertype, a field descriptor, a method descriptor, or the use of another generic type or class within the body of a method. As one example, class ArrayList<T> may extend AbstractList<T>, thereby created (e.g., defining) a dependency relationship between class ArrayList<T> and class AbstractList<T>.

Dependency-driven co-specialization may be triggered whenever a generic type parameter (e.g., characterized by <T> in the above examples) appears. Thus, dependency-driven co-specialization may be triggered (e.g., specialization may occur) whenever a generic type parameter appears as a supertype, as a target of a cast, as the type of a method parameter or return type, or virtually anywhere that a type parameter can appear, according to some embodiments. Thus, if a particular generic class appears virtually anywhere at all (e.g., within the API or implementation of a dependent class), then in order to be able to generate/specialize the dependent class, the particular generic class may be generated/specialized as well (e.g., either before, during or after the generation/specialization of the dependent class), according to some embodiments.

As shown in block 320, in response to determining the dependency relationship, the second generic class may be specialized for the particular type parameterization based on the determined dependency relationship, according to one embodiment. Continuing the example above, the specialization of ArrayList<T> for a particular type parameterization may trigger the specialization of AbstractList<T> for the same parameterization. If class ArrayList<T> were instantiated, and therefore specialized for T=int, the class AbstractList<T> may also be specialized for T=int, according to some embodiments.

Additionally, the same dependency relationship between classes (or other types) may also be used to trigger specialization for different parameterizations. For example, specializing ArrayList<T> for int may trigger the specializing of AbstractList<T> for int. Subsequently ArrayList<T> may be specialized for long, which may trigger the specialization of AbstractList<T> for long. In other words, once a dependency relationship between two generic classes is defined, that dependency relationship may trigger the specialization of the dependent class whenever (and however many times) the first class is specialized, according to some embodiments.

While described above using a dependency based on a superclass relationship, in other embodiments, a dependency may be based on other relationships between classes. For example, if a helper class LinkedListNode<T> is nested within the body of a class LinkedList<T>, instantiation of a LinkedList<T> may trigger co-specialization of LinkedListNode.

While described above as two separate and distinct specializations performed in a particular order, the specialization of the first and second generic classes may occur in any order and/or may overlap, according to various embodiments. For example, in one embodiment, specializer 250 may, determine the dependency relationship between the first generic class and the second generic class and, in response, may specialize the second generic class prior to specializing the first generic class. In another embodiment, specializer 250 may begin specializing the first generic class, determine the dependency relationship, specialize the second generic class and then complete the specialization of the first generic class.

Figure 4:
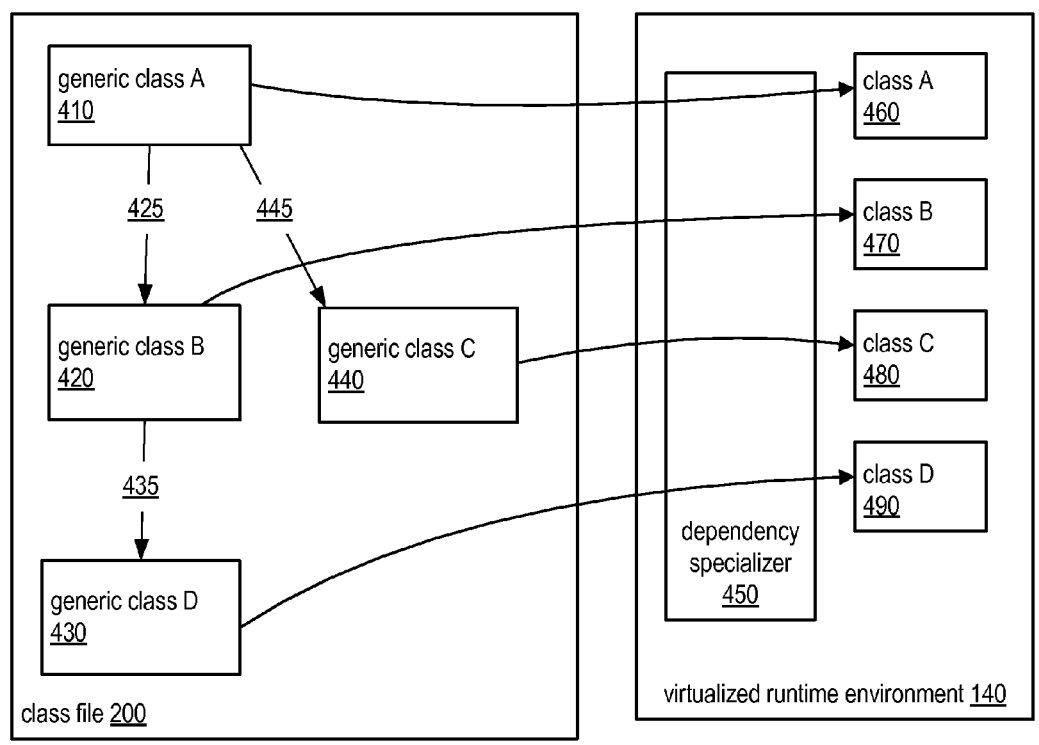
FIG. 4 is a logical block diagram illustrating dependency-driven, co-specialization involving multiple dependencies within a dependency chain, according to one embodiment.

While the examples above regarding FIGS. 2 and 3 illustrate a single dependency relationship between two classes, dependency-driven co-specialization may involve multiple (even many) layers of dependency (or dependency chains). In some embodiments, there may be many levels of dependencies in both depth and breadth. For example FIG. 4 is a logical block diagram illustrating a dependency-driven co-specialization involving multiple dependencies within a dependency chain according to one embodiment. As illustrated in FIG. 4, a class file may include multiple generic classes, such as generic class A 410, generic class B 420, generic class C 440 and generic class D 430. Additionally, the class file may define dependency relationships between the generic classes. For example, generic class A 410 may depend on generic class B 420 and generic class C 440, as illustrated by dependency relationships 425 and 435. Additionally, generic class B 420 may itself depend upon generic class D 430 as indicated by dependency relationship 435.

Thus, when a specializer of a runtime environment that is configured to implement dependency-driven co-specialization, such as dependency specializer 450 of virtualized runtime environment 140, specialized generic class A 410 to generate class A 460, it may determine (or recognize) the dependency relationships between generic class A 410 and generic class B 420 and generic class C 440. In response to determining the dependency relationships (e.g., when specializing generic class A 410), dependency specializer 450 may specialize generic class B 420 and generic class C 440 to generate class B 470 and class C 480, respectively.

Additionally, when specializing generic class B 420, whether independently (e.g., due to an independent instantiation of class B) or in response to the specialization of generic class A 410, dependency specializer 450 may specialize generic class D 430 to generate class D 490.

As noted above, the dependency between two classes may be defined based on various relationships between the classes. For example, a dependency between two classes may exist because one class extends another, or because its implementation references another class, or because its API names another class as one of its arguments or return types, according to various embodiments.

When a first generic class is specialized, the specializer may "trace" through any dependency chains based on dependency relationships between the first generic class and any other generic classes and specializes the other classes accordingly, in some embodiments.

Figure 5:
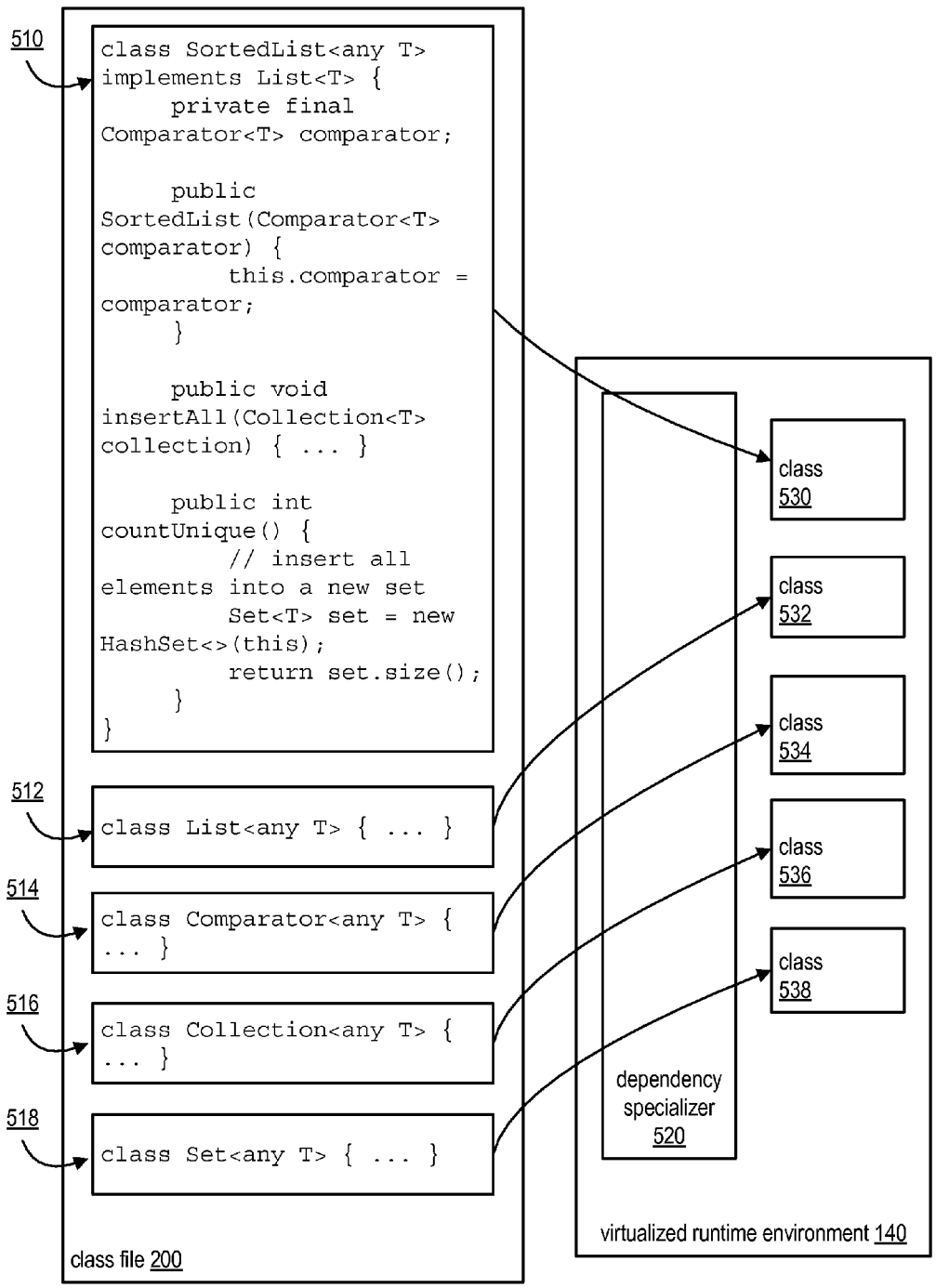
FIG. 5 is a logical block diagram illustrating dependency-driven co-specialization including multiple dependencies, according to one example embodiment.

FIG. 5 is a logical block diagram illustrating dependency-driven co-specialization including multiple dependencies, according to one example embodiment. As illustrated in FIG. 5, a class file may include multiple class definitions, such as classes 510, 512, 514, 516 and 518. One (or more) of the classes in class file may be dependent upon other classes. For example, class 510 may depend upon classes 512, 514, 516 and 518. For instance, the following example code illustrates on possible definition of class 510 that depends upon the other classes:

```
class SortedList<any T> implements List<T> {
    private final Comparator<T> comparator;
    public SortedList(Comparator<T> comparator) {
        this.comparator = comparator;
    }
    public void insertAll(Collection<T> collection) {
        ...
    }
    public int countUnique( ) {
        // insert all elements into a new set
        Set<T> set = new HashSet<>(this);
        return set.size( );
    }
}
```

Thus, the class SortedList is dependent upon multiple other classes, such as List, Comparator, Collection and Set. Specifically, List is a superclass of SortedList, Comparator is named within a field signature as a parameter to SortedList, Collection is named within a method signature and the class Set is used within the body of a method. Thus, SortedList is dependent upon each of the other classes based on different types of dependency relationships.

When specializing class 510 to generate class 530, dependency specializer 520 may determine that the class SortedList is dependent upon the other classes and in response may specialize classes 512, 514, 516 and 518 to generate classes 532, 534, 536 and 538, respectively, according to one example embodiment. Specifically, according to one embodiment, specializing SortedList<int> may trigger the specialization of List<int> (superclass), Comparator<int> (field signature), Collection<int> (method signature), and Set<int> (method body).

Additionally, the timing of specialization may vary from embodiment to embodiment, such as depending on differences between different runtime environments. For example, in one embodiment, Set<int> may not be specialized until the method countUnique is actually called during execution of the program.

While the examples above utilize public types, dependency-driven co-specialization is not limited to public types. For instance, the following sample code illustrates dependency-driven co-specialization with nonpublic types:

```
class LinkedList<any T> implements List<T> {
    private static class Node<any T> {
        T element;
        Node<T> next;
    }
    Node<T> root;
    ...
}
```

In the above example, even though the class Node is private to LinkedList, it may be specialized whenever LinkedList is specialized, according to some embodiments.

Additionally, the same generic class may be specialized multiple times for different type parameters as part of specializing a single dependent class. As one simplistic example, an interface Map<K, V> may be implemented using two different ArrayLists, one for keys and one for values, as illustrated in the following example code:

```
class TwoListMap<any K, any V> implements Map<K,V> {
    List<K> keys = new ArrayList<K>( );
    List<V> values = new ArrayList<V>( );
    ...
}
```

In the above example, ArrayList is co-specialized based on the individual type parameters of K and V.

Partial Specialization of Specialized Classes

Figure 6:
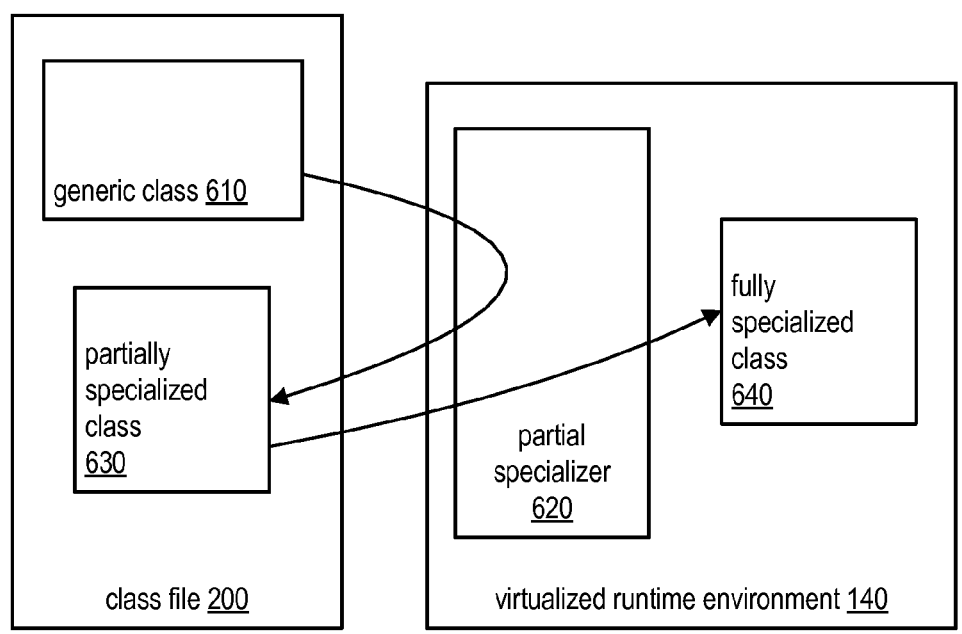
FIG. 6 is a logical block diagram illustrating the partial specialization of a generic class, according to one embodiment.

Generic classes may have more than one specializable type parameter, such as in the example, Map<K, V>. It may be desirable to specialize one or more of the type variables while not specializing others, (e.g. leaving others generic). FIG. 6 is a logical block diagram illustrating the partial specialization of a generic class, according to one embodiment. A specializer, such as partial specializer 620 of virtualized runtime environment 140, may be configured to partially specialize generic class 610 to produce partially specialized class 630 and may also be configured to subsequently further specialize partially specialized class 630 to generate fully specialized class 640, according to some embodiments.

For example, generic class 610 may represent the generic class Map<K, V> and partial specializer 620 may be configured to specialized generic class 610 to a map with generic keys but with int values for values, such as Map<K, int>. Alternatively the generic class Map<K, V> may be specialized to a map with int values for keys but with generic values, such as in Map<int, V>. This may be referred to herein as "partial specialization".

In some embodiments, the result of partial specialization may be one or more additional generic classes that are further specializable on the remaining type parameters. For example, partially specialized class 630 may represent Map<K, int> and may be further specializable to generate fully specialized class 640 which may represent one or more maps with particular types for the keys, such as Map<int, int> or Map<long, int>. In other words, for a generic type with more than one type variable (e.g., Map<K, V>), one of the type variables may be specialized (e.g., Map<int, V>) while not specializing the other type variable(s). The resulting class may be considered a partially specialized class that can be specialized further.

Thus, rather than performing the specialization of a generic class all at once, such as by specializing Map<K, V> into Map<int, int> or Map<long, int>, one type parameter may be partially specialized, such as resulting in Map<K, int>, and then at some later time the remaining type parameter(s) may be specialized, such as to generate Map<int, int> or Map<long, int>.

While illustrated in FIG. 6 as storing the partially specialized class 630 back to the class file 200, in some embodiments, the partially specialized class 630 may be stored in a different location, such as within a separate class file or in memory within virtualized runtime environment 140, among other locations.

Figure 7:
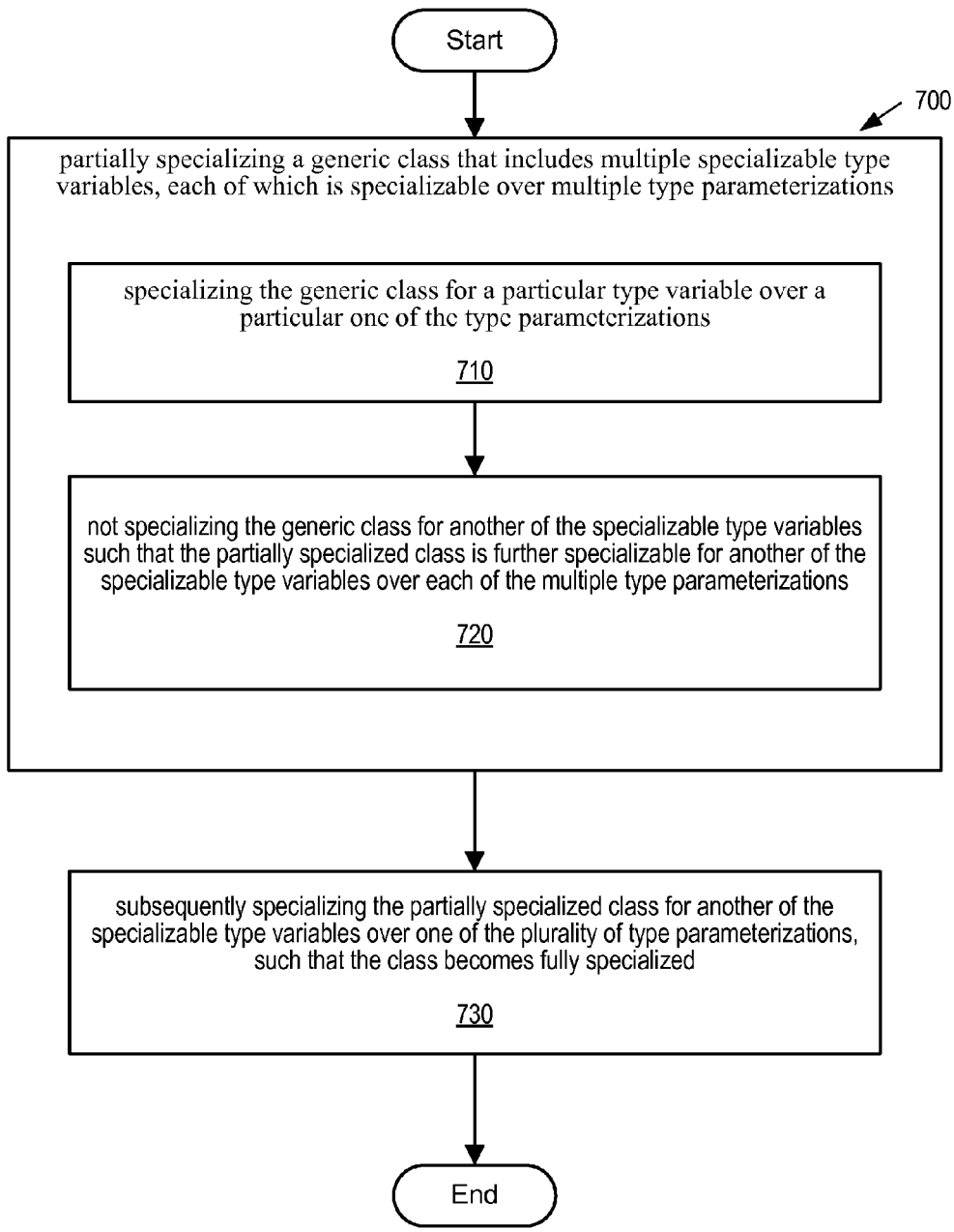
FIG. 7 is a flowchart illustrating one embodiment of a method for partial specialization of generic classes, as described herein.

FIG. 7 is a flowchart illustrating one embodiment of a method for partial specialization of generic classes, as described herein. As shown in block 700, a generic class may be partially specialized. The generic class may include multiple specializable types variables, each of which may be specializable over multiple type parameterizations, according to one embodiment.

As shown in blocks 710 and 720, partially specializing the generic class may involve specializing the generic class for a particular one of the multiple type variables over a particular one of the multiple type parameterizations, as shown in block 710, and not specializing the generic class for another of the specializable type variables, as shown in block 720, such that the partially specialized class is further specializable for at least one other of the multiple specializable type variables for each of the multiple type parameterizations. For example,

```
interface Map<any K, any V> { ... }
``` may be partially specialized for one type variable, such as K without specializing the other type variable. For instance, in the following example,

```
class IntBasedMap<any V> implements Map<int, V> { ... }
```

IntBasedMap may be a partial specialization of Map. Only one of Map's type variables (e.g., K) has been specialized, thus allowing IntBasedMap (e.g., the partially specialized Map<int, V>) to be further specialized for V over any all) of the type parameterizations over which Map may be specializable. In some embodiments, the partially specialized class may be further specializiable over each of the plurality of possible type parameterizations for which the class is specializable. Thus, after being partially specialized for K=int, as in the above example, the partially specialized Map (e.g,. as IntBasedMap) may be further specializable for V over other type parameterizations, such as for V=long, V=boolean, V=String, etc., according to various embodiments. Furthermore, as shown in the above example, a partially specialized class, such as Map<int, V>, may appear as a parameterized type (e.g., in an "extends" clause). In some embodiments, a parameterized type (e.g., Map<int, V>) may be recognized as a partial parameterization of a generic class (e.g., Map<K, V>) and the generic class may be partially specialized to form another generic class (e.g., Map<int, V>) allowing a parameterized type to be formed. Frequently, forming the parameterized type may mean "instantiating" the generic class Map<K, V> by binding type arguments to the type parameters K and V, but in some embodiments the identity function may be applied to the partially-specialized generic class Map<K, V> to form the parameterized type, similarly to the manner in which the type String is the identity function applied to a non-generic class String.

As shown in block 730, the partially specialized class may then be subsequently further specialized for another of the specializable type variables such that the partially specialized class becomes fully specialized, according to some embodiments. Continuing the above example, the partially specialized Map<int, V> (e.g., as IntBasedMap) may be further specialized for the remaining type variable (e.g., V), as in the following example, code:

```
class IntToIntMap extends IntBasedMap
    <int> { . . . }
```

Thus, Map<int, V> may be further specialized for V=int (as one example), resulting in a Map<int, int> (e.g., via IntBasedMap and IntToIntMap), according to one example embodiment. Additionally, after being further specialized over one type parameterization, the same partially specialized class may be further specialized over other type parameterizations. For example, the same partially specialized Map class may be further specialized for V=long, as in the following example code:

```
class IntToLongMap extends IntBasedMap
    <long> { . . . }
```

In some embodiments, partial specialization of a class may be accomplished by partially specializing metadata injected into the class (e.g., in order for the class to be specializable) and then propagating the partially specialized metadata into the new, partially specialized, class file so that the result of the partial specialization is re-specializable. Thus, partial specialization may be accomplished by forward-propagating a projection of specialization metadata from the original class into the result of the partial specialization, according to some embodiments.

This may come about by the way a developer is writing his code—the way he wants to have different levels of partial specialization. As described herein, there may be two different reasons to specialize a generic class. Firstly, specializing a generic class may result in better performance (e.g., operations on ints are faster than operations on objects) and secondly, a generic class may be specialized to take advantage of particular information regarding the arguments (e.g., such as to add new functionality that is only appropriate to certain type parameters).

Thus, it may be beneficial to have a Map where the keys are ints even if you don't know anything about the values (e.g., Map<int, V>). This partially specialized Map class may then be specialized to use particular map values without having to specialize the entire class (e.g., since Map<K, V> was already partially specialized to Map<int, V>).

Thus, partial specialization of classes may involve the specialization of classes to produce further specializable classes, according to some embodiments. For example, below is a partial specialization of HashMap:

```
class IntMap<K> extends HashMap<K,int>
```

The partial specialization of HashMap requires propagating metadata (as described above) into the generated class, so that the type variable K can be further specialized, and allowing the result of that further specialization to be recognized as a subtype of HashMap<K', int>.

In some embodiments, partially specialized classes may be declared explicitly, such as in the following example code:

```
class HashMap<int, V> implements Map<int, V>
```

Alternatively, multiple different partial specializations (e.g., Map<int, V>, Map<long, V>, etc.) may be automatically generated (e.g., by the runtime environment) that are themselves specializable as needed whenever a use of the particular type occurs. Thus, there may be multiple, different, partial specializations and they can appear anywhere in a class file that a parameterized type based on the specializable generic class could occur (e.g., a supertype, local variable, field type, the type of a method parameter, a type cast, etc.).

Figure 8:
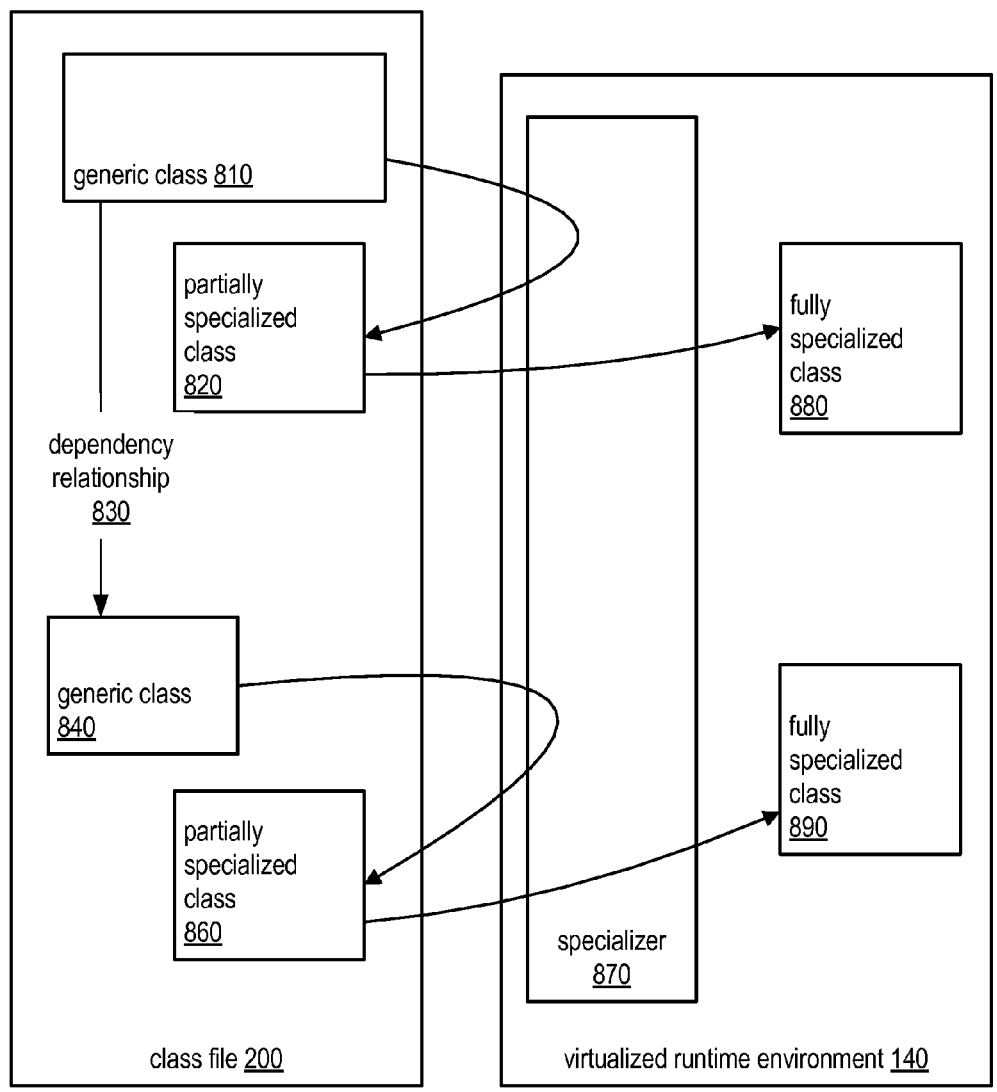
FIG. 8 is a logical block diagram illustrating partial specialization with dependency-driven co-specialization, according to one embodiment.

Furthermore, partial specialization may be combined with dependency-driven co-specialization described above. FIG. 8 is a logical block diagram illustrating partial specialization with dependency-driven co-specialization, according to one embodiment. A generic class 810 may include multiple generic type variables and may be partially specialized by specializer 850 of virtualized runtime environment 140 to generate partially specialized class 820. Additionally, generic class 810 may be dependent on generic class 840, as indicated by dependency relationship 830. As noted above, a dependency relationship may involve (or be defined/created by) the use of a supertype, a field descriptor, a method descriptor, or the use of another generic type or class within the body of a method. For example, generic class 810 may represent a generic class Map<K, V> which may utilize, as part of its implementation, a generic MapNode class represented as generic class 840, as in the following example code:

```
class Map<any K, any V> {
    MapNode<K, V> rootNode;
    ...
}
class MapNode<any K, any V> {
    ...
}
```

When specializer 870 partially specializes the generic class 810 to generate partially specialized class 820, specializer 870 may determine or recognize the dependency relationship between generic class 810 and generic class 840 and therefore may (partially) specialize generic class 840 generating partially specialized class 860.

For example, partially specializing Map<K, V> for K=int may trigger the partial specialization of MapNode<K, V> for K=int, as shown the following example code:

```
class Map<int, any V> {
    MapNode<int, V> rootNode;
    ...
}
class MapNode<int, any V> {
    ...
}
```

Subsequently, the partially specialized class 820 may be further specialized to generate fully specialized class 880, which may also trigger the further specialization of partially specialized class 860 to generate fully specialized class 890, according to one embodiment. For instance, partially specialized Map<int, V> may be further specialized for V=int, triggering the further specialization of MapNode (int , V) for V=int, as shown in the following example code:

```
class Map<int, int> {
    MapNode<int, int> rootNode;
    ...
}
class MapNode<int, int> {
    ...
}
```

As another example, a generic class HashMap<K, V> may extend Map<K, V>. Partially specializing HashMap, such as for K=int, may trigger the (partial) specialization of Map for K=int, according to some embodiments.

As yet another example, a method of Map<K, V> may take a mapping function from V to U, and return a Map<K, U> (whose mappings may be (k, mapper(v)) for all (k,v) in the original map). When Map is partially specialized, the specialization of the mapper function may be triggered based on a dependency relationship between the map class and the mapper function, as shown in the following example code:

```
interface Map<any K, any V> {
    // make a new map whose elements are (k, mapper(v))
    <U> Map<K, U> transformValues(Function<V, U> mapper);
}
class IntBasedMap<any V> implements Map<int, V> {
    @Override
    <U> Map<int, U> transformValues(Function<V, int>
        mapper)
        { ... }
}
```

Manual Refinement of Specialized Classes

While a runtime specializer may always be able to generate an automated specialized version of a generic class, in some embodiments an alternate form of user control over specialization may involve using the automated specialization while also adding (or overriding) specialization-specific method implementations. In general, the set of members of a generic class do not change when it is specialized—the same members exist in the auto-specialized version as in the generic version, according to some embodiments. However, manual refinement of specialized classes may allow a developer to hand specialize a better representation and/or implementation of one or more methods of the specialized class.

In other words, a generic class List may be generic in any T and the auto specialized versions of List may include all the fields and methods of the generic version, but if List is specialized for T=int, a new version of a specific method may be included. Thus, List is specialized for T=int, the hand specialized version of the method may be used in place of the auto specialized version, according to some embodiments.

As another example, methods for specific type parameterizations may be added to ArrayList, as shown below:

```
class ArrayList<T> {
    // Methods common to all instantiations
    <where T=int> int sum( ) { ... }
    <where T=float> float sum( ) { .... }
}
```

In some embodiments, certain methods might make sense for some instantiations of a generic class, but not for others. For example, a sum ( ) method on List<T> might make sense if T is int or long, but not Shoe or some other object. Some embodiments may include a declaration-site mechanism to condition members on a given instantiation. This may also include members that might be inconsistent with each other if they both appeared, such as an int-bearing sum ( ) method for List<int> and a double-bearing sum ( ) method for List<double>. Additionally, some embodiments may include a class file representation that allows certain members to be ignored when the class is instantiated as an erased class, that is, without any type parameterization.

Manual Refinement of Specialized Classes to Override Functionality

Manual refinement of specialized classes to replace (override) functionality that would otherwise be generated by the specializer, according to some embodiments. In a manner similar to the wholesale replacement of auto-specialized classes, described above, methods may also be added (manually) to replace functionality, such as to override auto-specialized members.

For some instantiations of a generic class, it may be preferable to replace the auto-specialized version. Some embodiments may include a mechanism (such as a linguistic mechanism) by which a single class file may describe both a generic version of a class member, and then "override" that generic version in one or more instantiation-specific layers. The class may then include both the generic version and the alternate version of the method for particular type specializations.

Figure 9:
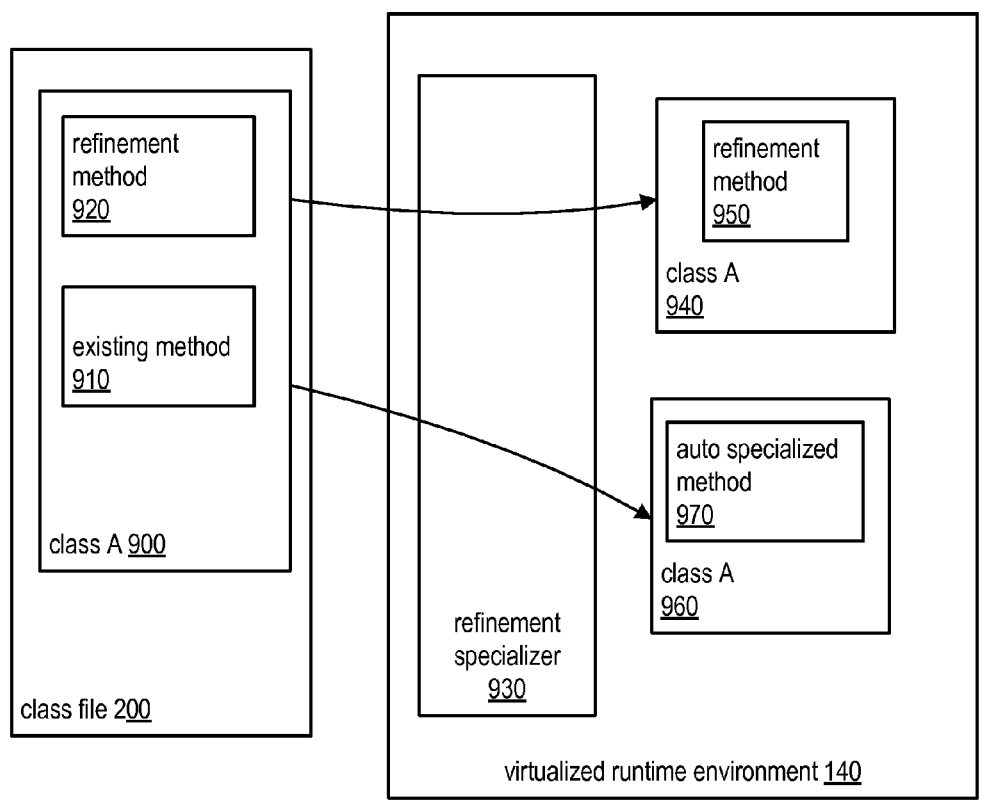
FIG. 9 is a logical block diagram illustrating manual refinement of a specialized class, according to one embodiment.

FIG. 9 is a logical block diagram illustrating manual refinement of a specialized class, according to one embodiment. As shown in FIG. 9, a class file 200 may include a class A 900 that includes an existing method 910 that may be auto specialized when class A 900 is specialized. Additionally, class A 900 may also include a refinement method 920 to be used in place of the existing method 920 when class A 900 is specialized for particular type parameters. When class A 900 is specialized, refinement specializer 930 may be configured to determine whether or not the particular type parameterization for which the class is being specialized is one for which the refinement method should be used. In other words, the specializer may determine that the refinement method corresponds to the particular type parameterization for which the class is being specialized. If refinement specializer 930 determines that refinement method 920 should be used, then refinement specializer 930 may load and specialize the class including the refinement method, as illustrated by class A 940 and refinement method 950. Alternatively, if the class is being specialized for a different type parameterization for which the refinement method should not be used, refinement specializer 930 may load and specialize the class using an auto specialize version of the existing method 910, as shown by class A 960 and auto specialized method 970.

Thus, an alternate form of user control may be utilized to enhance the automated specialization by overriding specific methods (or adding new methods) for specific type parameterizations, according to some embodiments. Thus, a developer may be able to utilize the best possible implementation for some types while relying on the generic (e.g., auto specialized) version for other types. For example, List<int> may have a sum ( ) method, or an optimized version of existing methods may be hand-written for specific type parameterizations. A user of the generic class may not have to know anything about the manual refinements. For instance, a user of a generic class may not have to request or specify that the manual refinements or overridden versions be used in order to take advantage of them. Instead, just instantiating the class for particular type parameters may trigger the use of the manual refinements (e.g., as provided by the developer of the generic class) without any particular knowledge or request by the user of the generic class, according to some embodiments.

In one embodiments, the developer of the generic class may write multiple versions (e.g., of the overridden methods) and the compiler may be configured to compile that code into multiple versions in the class file. The class file may also include information indicating which versions to use for which type specializations. Additionally, the runtime environment may be configured to use the information in the class file to determine which version to use when loading a particular specialization.

As another example, a class Box may hold a value, as in the following example code:

```
class Box<any T> {
    T t;
    String toString( ) {
        return "Box[" + t.toString( ) "]";
    }
    <where T=int>
    String toString( ) {
        return "Box[" + Integer.toString(t) + "]";
    }
}
```

In the above example, the method toString may work for all types T, but a more specialized version of toString ( ) may be provided for instantiations of Box where T=int, perhaps to give a better answer, or because of a faster implementation. Additionally, in some embodiments, additional type constraints (T=int) may be used within the body of the specialized version of toString ( ) to type-check the body, such as to ensure that the compiler knows that the type of 't' is really 'int', not the generic 'T'.

When overriding a particular method of a specialized generic class, an alternate version of the method may be included in the class file and may be indicated as applying to particular set of specializations (e.g., for certain type parameters), according to some embodiments. In some embodiments, when the methods of the generic class are specialized at runtime, if one of the particular specializations corresponding to the alternate version of the method is used, the alternate version of the method may be used (e.g., copied to the specialized class) rather than the auto specialized version.

In some embodiments, a refinement method may be utilized for multiple type parameterizations. For example, a refinement method may be specific to short and char, as in the following example:

```
<where T extends Serializable> void writeObject( ) { ... }
// For short and char only
<where T has 16 bits> void swapBytes( ) { ... }
```

Figure 10:
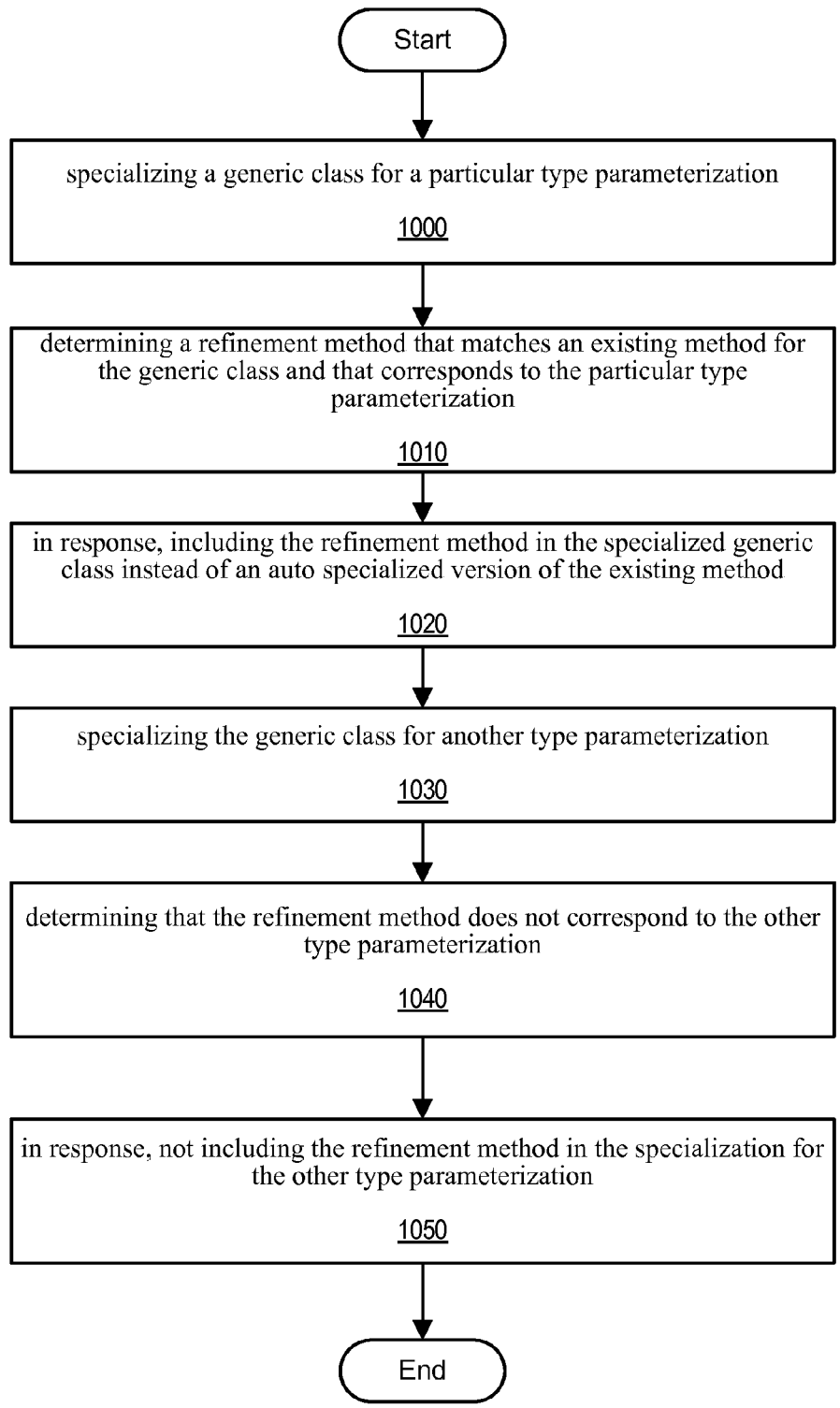
FIG. 10 is a flowchart illustrating one embodiment of a method for manual refinement of specialized classes, as described herein.

FIG. 10 is a flowchart illustrating one embodiment of a method for manual refinement of specialized classes, as described herein. As shown in block 1000, a generic class may be specialized for a particular type parameterization. For instance, at runtime, a class file may be loaded that includes a class declaration for a generic class that is specializable over a plurality of type parameterizations. The class declaralation may include a refinement method specific to a particular one of the plurality of type parameterizations and may provide an alternate implementation for a method of the generic class when the class is specialized for the particular type parameterization.

For instance, a specializer may be configured to load and specialize a Box class for T=int. As shown in block 1010, the specializer may determine a refinement method that matches an existing method for the generic class and that corresponds to the particular type parameterization. For example, the specializer may determine that a refinement toString method exists for the Box class that overrides the generic toString method and that corresponds to the type parameterization T=int.

As shown in block 1020, in response to determining that the refinement method corresponds to the particular type parameterization, the specializer may include the refinement method in the specialized version of the generic class instead of including an auto specialized version of the existing method, according to one embodiment. In other words, when specializing the generic class for the particular type parameterization, a specializer may be configured to include a refinement method in the specialized class based on the particular type parameterization. For example, the specializer may include the refinement toString method in the specialized version of the Box class rather than including the generic or auto specialized version of the toString method. Thus, the refinement method may provide an alternate implementation for a method of the generic class when that class is specialized for a particular type parameterization.

Additionally, the generic class may be specialized for a different type parameterization, as shown in block 1030, and the specializer may determine that the refinement method does not correspond to the different type parameterization, as shown in block 1040. For example, the Box class from the example above may be specialized for a type parameterization other than T=int and therefore the specializer may determine that the refinement toString method does not correspond to the type parameterization. In response, the specializer may not include the refinement method in the specialization for the other type parameterization, as shown in block 1050. For example, when specializing the Box class for another type parameterization other than T=int, the specializer may not include the refinement toString method (e.g., that corresponds to T=int) in the specialized version of the class, but instead may include the auto specialized version of the toString method. Alternatively, another refinement stostring method may exist (e.g., in the class declaration) for the other type parameterizations and thus may be included in the specialized class when the class is specialized for the other type parameterization, according to one embodiment.

When the developer has particular knowledge regarding the types, there may be a better (e.g., smaller, faster, more efficient) implementation than the automated version. For example, if a program uses the parameterized type ArrayList<boolean>, then the auto specialized version of the ArrayList<T> class may utilize a default element size that is larger than the minimum needed to store a boolean value. For instance, in the Java programming language, a boolean may, by default, be stored using an 8-bit (or larger) location. Thus, in some embodiments, a developer may be able to provide his own implementation that uses a different storage mechanism (e.g., using an internal array of longs and performing bitwise calculations) when ArrayList<T> is specialized for T=boolean.

Thus, there may be a generic ArrayList<T>, but if it is instantiated for T=boolean, a different, hand-written, class could be used in place of the auto-specialized version. In some embodiments, the auto-specialized version and the hand-written version may be required to have the same signatures, but may have completely different representations and/or completely different members, etc.

Additionally, an auto specialized version of a generic class may only be partially overridden with different methods for different specializations. Thus, rather than replacing the entire class and/or implementation, individual methods may be replaced (e.g., to use a better implementation) or individual method could be add (as noted above) that only exists in a particular instantiation. Thus, a developer may provide hand-written refinements providing completely new representations of classes, individual replacement (e.g., override) methods, and/or additional methods, according to some embodiments.

For example, while List<int> may have an auto-specialized implementation of add and get, it may be beneficial to include a sum method for certain type parameterizations (e.g., T=int), that may not be a member of all specialized versions of List (e.g., for all type parameterizations of T).

For instance:

```
class List<T> {
    void add(T t) { ... }
    T get(int index) { ... }
    <where T=int> int sum( ) { ... }
}
```

Manual Refinement to Provide a New Method

In some embodiments, the compiler and/or runtime may allow methods, such as to add new functionality to a specialized class, to be manually added to the class for certain (e.g., one, some or all) specialized versions of the class that would not be present in the auto specialized version.

Figure 11:
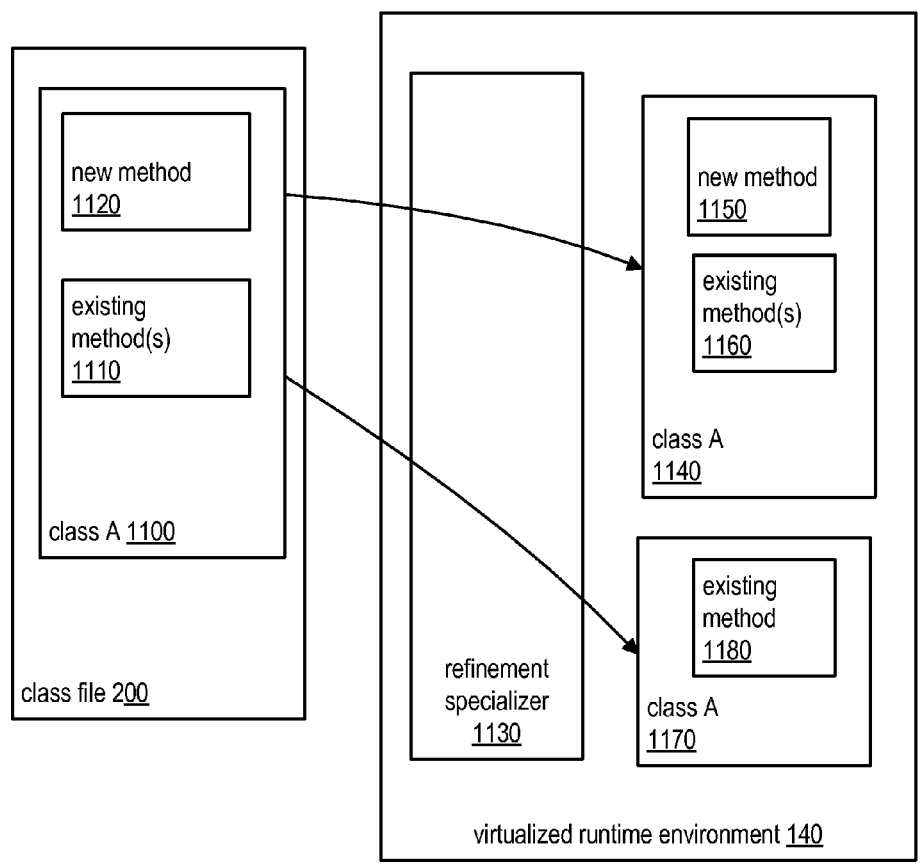
FIG. 11 is a block diagram illustrating manual refinement for adding new methods to specialized classes, according to one embodiment.

FIG. 11 is a block diagram illustrating manual refinement for adding new methods to specialized classes, according to one embodiment. As shown in FIG. 11, a class file may include a class A 1100 that includes both existing method(s) 1110 and a new method 1120 that corresponds only to particular type parameterizations. When class A 1100 is specialized for a type parameterization for which new method 1120 corresponds, refinement specializer 1130 may include the new method, as well as specialized versions of the existing method(s) in the specialized version of the class, as shown by new method 1150 and existing method(s) 1160 in class A 1140, according to one embodiment.

However, when the class is specialized for a type parameterization for which the new method does not correspond, the specializer may not include the new method in the specialized class, but instead may only include specialized versions of the existing method(s), as shown by class A 1170 including existing method(s) 1180 but not including a specialized version of the new method.

Thus, rather than simply replacing the body of a method based on the instantiation of a type variable, a new method may be added. The new method may be referred to as a "conditional" method since it may only be included in certain type specializations, according to some embodiments.

As a further example:

```
class List<any T> {
    // regular List methods here
    void add(T t) { ... }
    T get(int index) { ... }
    ...
    <where T=int>
    int sum( ) {
        int result = 0;
        for (int t : this)
            result += t;
        return result;
    }
    <where T=long>
    long sum( ) {
        long result = 0;
        for (long t : this)
            result += t;
        return result;
    }
}
```

In the example above, two conditional sum ( )methods are added to List. One of the Sum ( ) methods is a member of the instantiation List <int> and the other which is a member of the instantiation List <long>, while neither is a member of List<?> or the generic List<T>.

Figure 12:
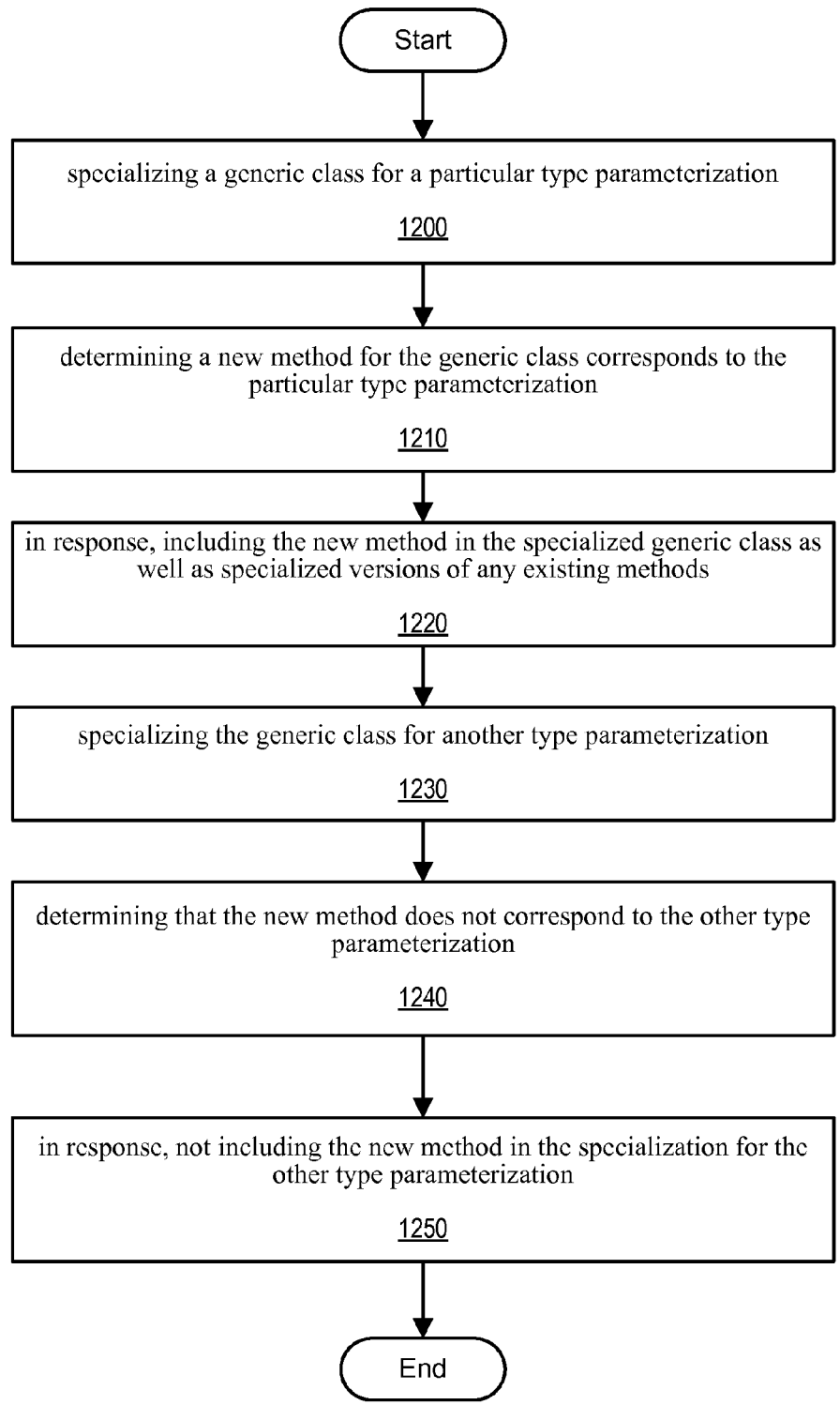
FIG. 12 is a flowchart illustrating one embodiment of a method for adding new method via manual refinement of specialized classes, as described herein.

FIG. 12 is a flowchart illustrating one embodiment of a method for adding new method via manual refinement of specialized classes, as described herein. As shown in block 1200, a generic class may be specialized for a particular type parameterization. For instance, a specializer may be configured to load and specialize a class for a particular type parameterization. Using the example above, a specializer may be configured to load and specialize the List class for T=int. As shown in block 1210, the specializer may determine a new method for the generic class that corresponds to the particular type parameterization. For example, the specializer may determine that for the Box class, a new sum ( ) method exists that corresponds to the type parameterization T=int.

As shown in block 1220, in response to determining that the new method corresponds to the particular type parameterization, the specializer may include the new method in the specialized version of the generic class as well as including auto specialized versions of any existing methods, according to one embodiment. For example, the specializer may include the sum ( ) method in the specialized version of the List class as well as including the generic or auto specialized versions of the add ( ) and get ( ) methods.

Additionally, the generic class may be specialized for a another type parameterization, as shown in block 1230, and the specializer may determine that the new method does not correspond to the other type parameterization, as shown in block 1240. For example, the List class from the example above may be specialized for a type parameterization other than T=int and therefore the specializer may determine that the new sum ( ) method does not correspond to the type parameterization. In response, the specializer may not include the new method in the specialization for the other type parameterization, as shown in block 1250. For example, when specializing the List class for a type parameterization other than T=int, the specializer may not include the sum ( ) method (e.g., that corresponds to T=int) in the specialized version of the class, but may only include auto specialized version of the add ( ) and get ( ) methods.

In some embodiments, a refinement method may be used for more than one type parameterization. For instance, a generic class may include a refinement method for T=Object. In some embodiments, if the generic class is specialized for T=String (i.e., String is an Object), the refinement method for T=Object may be included in the specialized version of the generic class. In other embodiments however, if the same generic class is specialized for T=String, the refinement method (e.g., for T=Object) may not be included in the specialized version. Thus, in some embodiments, particular refinement methods may only be used when a generic class is specialized for the exact type parameterization for which the particular refinement method is specified, while in other embodiments, refinement methods may be used over multiple type parameterizations.

Wholesale Replacement of Specialized Classes

Additionally, in some embodiments, neither the auto specialization of a generic class nor a manual refinement of the class may be used, but instead, a completely new, hand-written, class may be used instead. In general, the replacement class may have the same interface as the generic or auto specialized version, but it may have a completely different representation and/or implementation. Thus, according to some embodiments, the replacement class may be required to have (at least) all the same methods that the generic or auto specialized versions of the class would have (e.g., so that the alternate version of the class respects the Liskov Substitution Principle). At runtime, the runtime environment may load the alternate version of the class whenever the particular specialization is instantiated.

Figure 13:
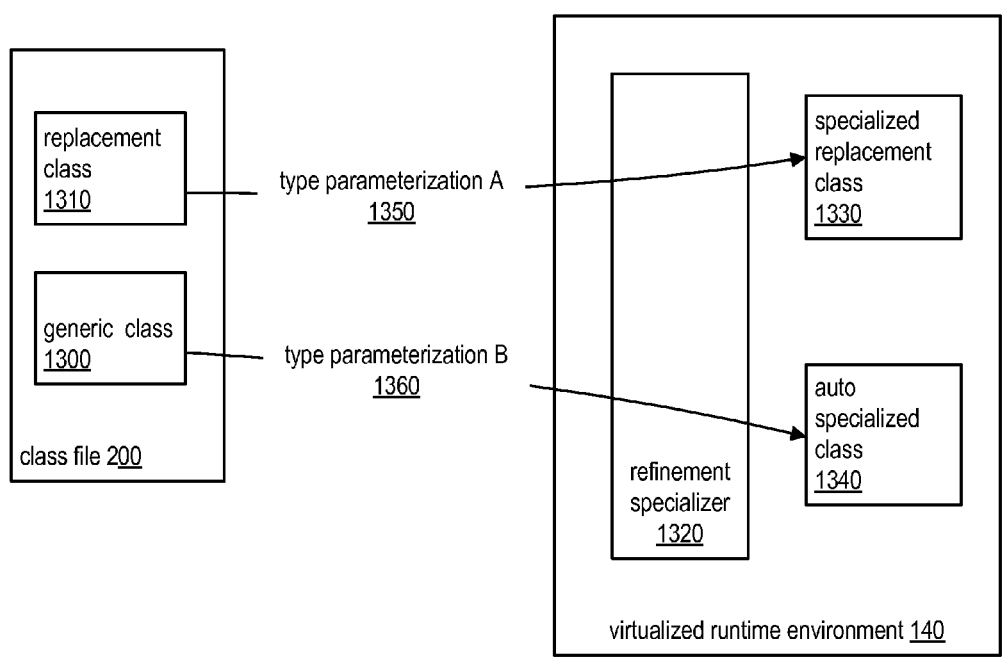
FIG. 13 is a logical block diagram illustrating manual refinement for wholesale replacement of generic class, according to one embodiment.

FIG. 13 is a logical block diagram illustrating manual refinement for wholesale replacement of generic class, according to one embodiment. As shown in FIG. 13, class file 200 may include a generic class 1300 as well as a replacement class 1310. Replacement class 1310 may correspond to particular type parameterizations and may be intended to replace generic class 1300 when generic class 1300 is specialized for those particular type parameterizations. For instance, when generic class 1300 is specialized for a type parameterization A 1350 to which replacement class 1310 corresponds, refinement specializer 1320 may load specialized replacement class 1330 instead of an auto specialized version of generic class 1300. Alternatively, when generic class 1300 is specialized for a different type parameterization, such as type parameterization B 1360, to which replacement class 1310 does not correspond, the specializer may load and specialize generic class 1300, as represented by auto specialized class 1340.

In one embodiment, the generic or auto specialized version of the class may include information identifying the alternate version of the class and indicating which type parameterizations may trigger use of the alternate version. In other embodiments, however, information identifying the alternate version of the class and indicating which type parameterizations may trigger use of the alternate version may be stored somewhere other than within the generic or auto specialized version of the class (e.g., in the class file or an information registry) and therefore the runtime may not have to load the generic or auto specialized version of the class when using the alternate version of the class.

For instance, a replacement custom representation for a given instantiation of a generic class may be provided, as in the following example:

```
class ArrayList<any T> { ... }
specialization ArrayList<boolean> {
    BitSet bitSet = ...;
    // implement members of ArrayList backed by bitSet
}
```

Similarly, we might have a specialized representation of a hash table whose keys and values are ints:

```
class HashMap<any K, any V> implements Map<K,V> { ... }
specialization HashMap<int, int> {
    // alternate implementation
}
```

When implementing wholesale replacement of classes, the runtime classloader and/or specializer may be configured to determine that the replacement class should be used (e.g., based on the particular type parameter being instantiated) and to locate and load the replacement class in place of the auto specialized and/or manually refined version of the generic class, according to some embodiments.

Figure 14:
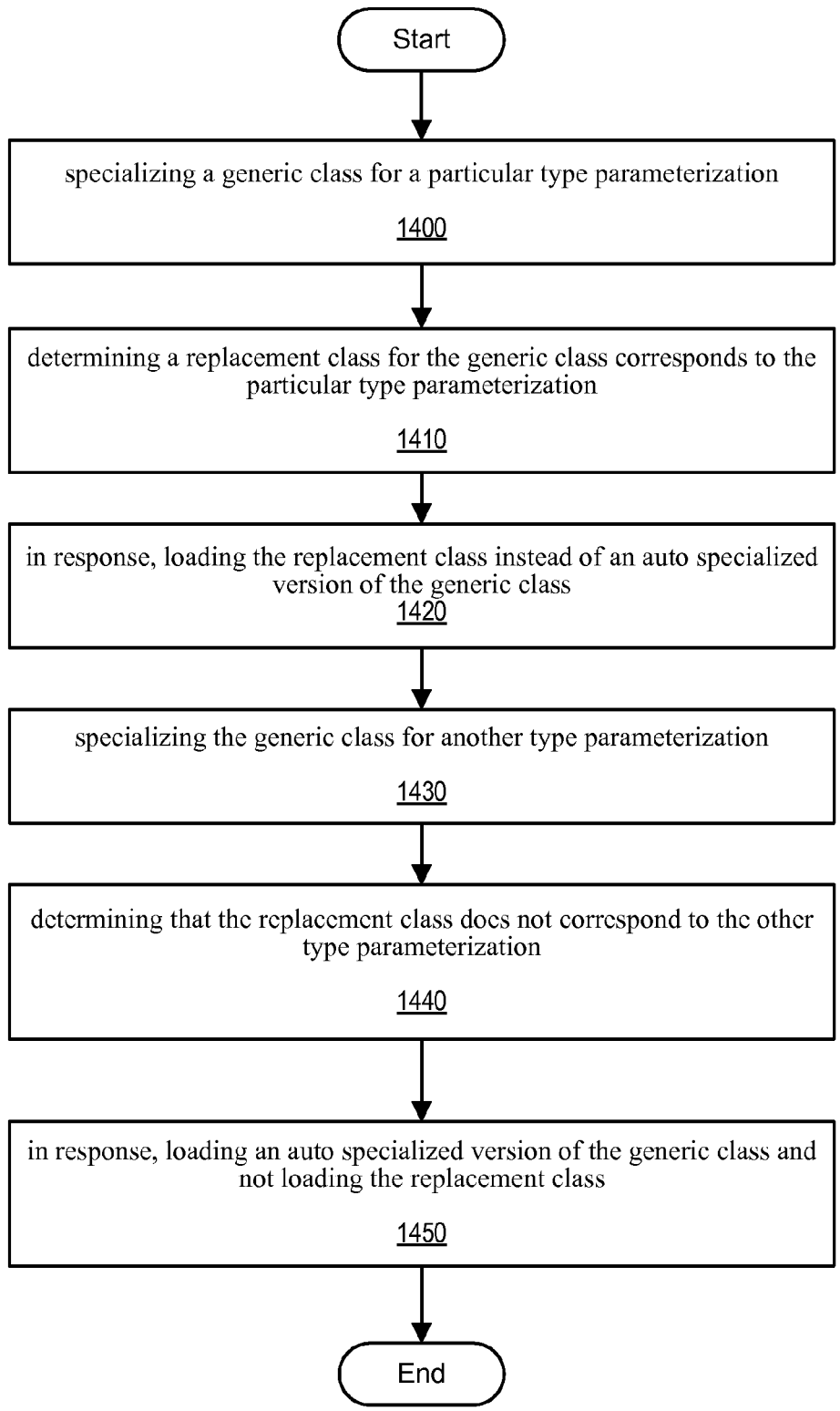
FIG. 14 is a flowchart illustrating one embodiment of a method for wholesale replacement of classes via manual refinement, as described herein.

FIG. 14 is a flowchart illustrating one embodiment of a method for wholesale replacement of classes via manual refinement, as described herein. As shown in block 1400, a generic class may be specialized for a particular type parameterization. For instance, using the example above, a specializer may be configured to load and specialize the ArrayList class for T=boolean. The ArrayList class may be a generic class that is based on a generic class declaration and may be specializable over a plurality of type parameterizations, according to some embodiments. As shown in block 1410, the specializer may determine a replacement (e.g., a refinement) class for the generic class that corresponds to the particular type parameterization. For example, the specializer may determine that a refinement version of the ArrayList class exists and corresponds to the type parameterization T=boolean. In one embodiment, a class file for ArrayList may include a refinement class declaration for ArrayList that provides (e.g., includes) an alternate implementation for the generic ArrayList for when the generic class is specialized for a particular type parameterization (e.g., T=boolean).

As shown in block 1420, in response to determining that the replacement class corresponds to the particular type parameterization, the specializer may load the replacement class instead of loading an auto specialized version of the generic class, according to one embodiment. For example, the specializer may load the ArrayList<boolean> version of ArrayList, instead of the auto specialized version of the ArrayList.

Thus, in one embodiment, specializing a generic class may include loading a class corresponding to (e.g., based on) a refinement class declaration for the generic class that is specific to a particular type parameterization and that provides an alternate implementation for the generic class when the generic class is specialized for the particular type parameterization. Furthermore, the generic class may be specializable for other type parameterizations without loading the class that corresponds to the refinement class declaration.

For instance, the generic class may be specialized for another type parameterization, as shown in block 1430, and the specializer may determine that the replacement class does not correspond to the other type parameterization, as shown in block 1440. For example, the ArrayList class from the example above may be specialized for a type parameterization other than T=boolean and therefore the specializer may determine that the replacement class (e.g., ArrayList<boolean>) does not correspond to the other type parameterization. In response, the specializer may not load the ArrayList<boolean> version of ArrayList, but instead may load an auto specialized version of ArrayList, as shown in block 1450, according to one embodiment.

As described above regarding manual refinement of methods, in some embodiments, a refinement class declaration may be used for more than one type parameterization. For instance, a generic class may have a refinement generic class declaration for T=Object. In some embodiments, if the generic class is specialized for T=String (i.e., String is an Object), the refinement class declaration for T=Object may be used for the specialized version of the generic class. In other embodiments however, if the same generic class is specialized for T=String, the refinement class declaration (e.g., for T=Object) may not be used for the specialized version of the class. Thus, in some embodiments, particular refinement class declarations may only be used when a generic class is specialized for the exact type parameterization for which the particular refinement class declaration is specified, while in other embodiments, refinement methods may be used over multiple type parameterizations.

In some embodiments, manual refinement of specialized generic classes may also be combined with partial specialization and dependency-driven co-specialization of generic classes, as described above. For example, a partially specialized class may be manually refined to include some additional functionality for one or more specializations and the partial specialization may also trigger the (full or partial) specialization of one or more other generic classes.

Manual Refinement of Generic Methods

In addition to utilizing manual refinements based on a specific instantiation of a class type parameter, as described above, manual refinements may also be provided based on a method type parameter of a generic method. When a generic method in a class (e.g., the class itself does not have to be generic) is specialized for a particular type, an alternate version of the method may be used, in some embodiments.

For example, suppose we have:

```
class IntList extends List<int>{ ... }
``` and we have a generic method:

```
<any T> List<T> singletonList(T element) {
    List<T> list = new List<T>( );
    list.add(element);
    return list;
}
```

We can specialize the T=int instantiation:

```
specialization<T=int> List<T> singletonList(T element) {
    IntList list = new IntList( );
    list.add(element);
    return list;
}
```

Here, we're saying that this is a specialization of an existing generic method, for a particular combination of type parameters. When a developer writes different versions of the method, the different versions may be propagated by the compiler into the class file and at runtime, a particular version of the method is loaded based upon the particular type parameters being specialized.

Figure 15:
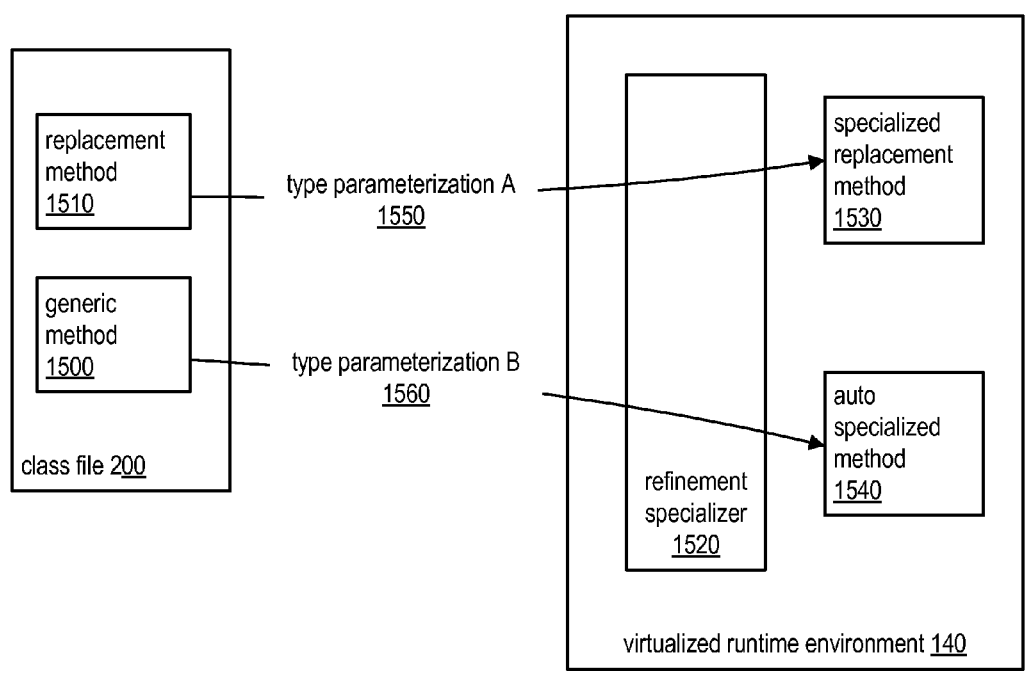
FIG. 15 is a logical block diagram illustrating manual refinement for generic methods, according to one embodiment.

FIG. 15 is a logical block diagram illustrating manual refinement for generic methods, according to one embodiment. As shown in FIG. 15, class file 200 may include a generic method 1500 as well as a replacement method 1510. Replacement method 1510 may correspond to particular type parameterizations and may be intended to replace generic method 1500 when generic method 1500 is specialized for those particular type parameterizations. For instance, when generic method 1500 is specialized for a type parameterization A 1550 to which replacement method 1510 corresponds, refinement specializer 1520 may load specialized replacement method 1530 instead of an auto specialized version of generic method 1500. Alternatively, when generic method 1500 is specialized for a different type parameterization, such as type parameterization B 1560, to which replacement method 1310 does not correspond, the specializer may load and specialize generic method 1500, as represented by auto specialized method 1540.

Figure 16:
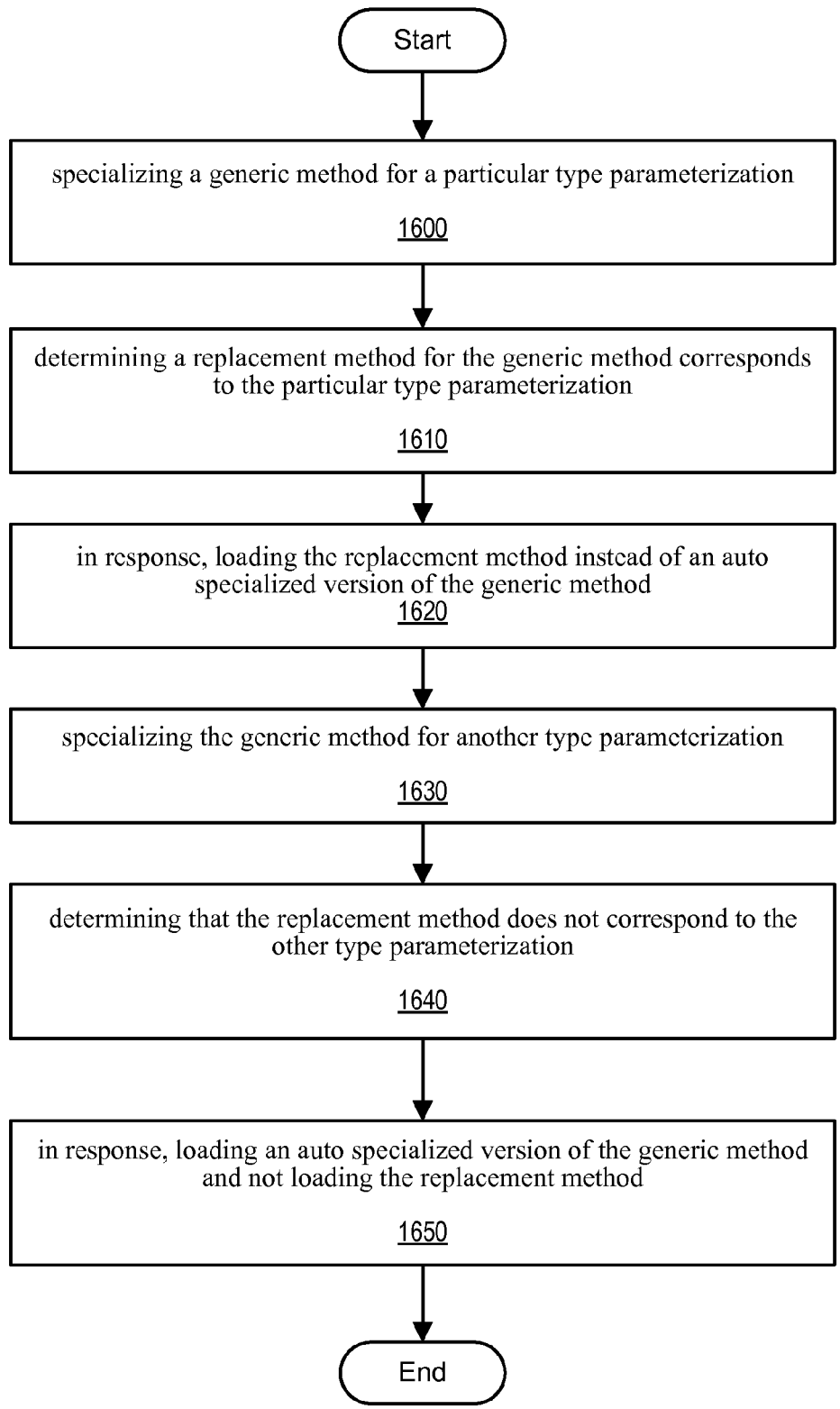
FIG. 16 is a flowchart illustrating one embodiment of a method for manual refinement for generic methods, as described herein.

FIG. 16 is a flowchart illustrating one embodiment of a method for manual refinement for generic methods, as described herein. As shown in block 1600, a generic method may be specialized for a particular type parameterization. For instance, a specializer may be configured to load and specialize a method for a particular type parameterization. Using the example above, a specializer may be configured to load and specialize the singletonList method for T=int. As shown in block 1610, the specializer may determine a replacement method for the generic method that corresponds to the particular type parameterization. For example, the specializer may determine that a replacement version of the singletonList method exists and corresponds to the type parameterization T=int.

As shown in block 1620, in response to determining that the replacement method corresponds to the particular type parameterization, the specializer may load the replacement method instead of loading an auto specialized version of the generic method, according to one embodiment. For example, the specializer may load the specialization<T=int> version of the singletonList method, instead of the auto specialized version of the singletonList.

Additionally, the generic method may be specialized for a another type parameterization, as shown in block 1630, and the specializer may determine that the replacement method does not correspond to the other type parameterization, as shown in block 1640. For example, the singletonList method from the example above may be specialized for a type parameterization other than T=int and therefore the specializer may determine that the replacement method (e.g., the specialization<T=int> version) does not correspond to the other type parameterization. In response, the specializer may not load the specialization<T=int> version of the singletonList method, but instead may load an auto specialized version of the singletonList method, as shown in block 1650, according to one embodiment.

Figure 17:
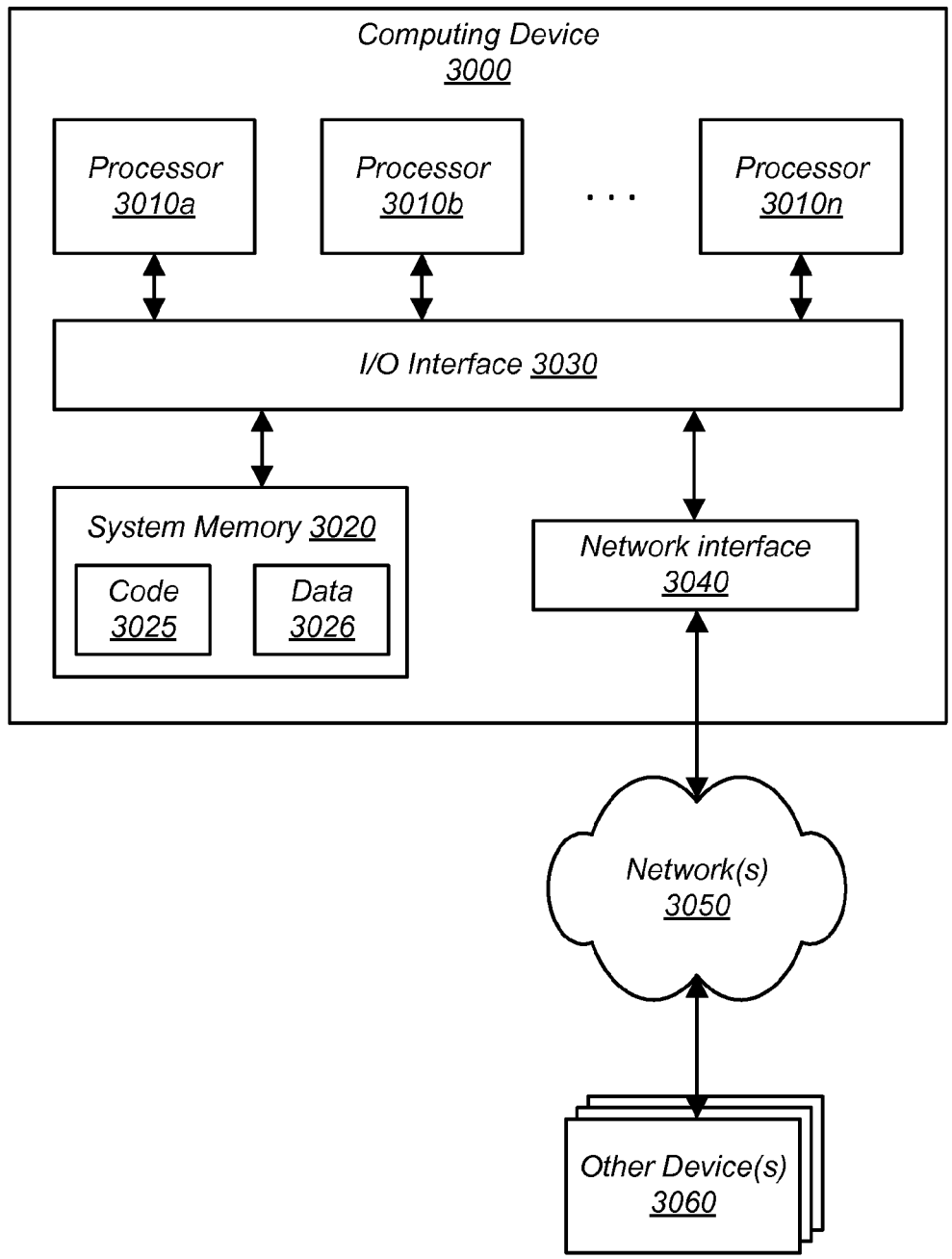
FIG. 17 is a logical block diagram illustrating an example computer system suitable for implementing dependency-driven co-specialization of specialized classes, according to one embodiment.

In at least some embodiments, a computer system that implements a portion or all of one or more of the technologies described herein may include a general-purpose computer system that includes or is configured to access one or more computer-readable media. FIG. 17 illustrates such a general-purpose computing device 3000 suitable for implementing the method, features and enhancements described herein. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026. For example, memory 3020 and well as code 3025 and data 3026 may store, in one embodiment, program instructions and data for implementing compiler 120 and/or virtualized runtime environment 140, described above.

In various embodiments, compiler 120 and/or virtualized runtime environment 140 (and/or any individual sub-modules thereof) may each be implemented in any of various programming languages or methods. For example, in one embodiment, compiler 120 and/or virtualized runtime environment 140 may be written in any of the C, C++, assembly, JAVA or other general purpose programming languages, while in another embodiment, one or more of them may be written using a different, more specialized, programming language. Moreover, in some embodiments, compiler 120 and/or virtualized runtime environment 140 (and/or various sub-modules thereof) may not be implemented using the same programming language.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example.

In some embodiments, system memory 3020 may be one embodiment of a computer-readable (e.g., computer-accessible) medium configured to store program instructions and data as described above with respect to FIGS. 1-6 for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory.

Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 17 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. For example, actions, processes, methods, tasks or functions described herein as being performed by Compiler 120 may, in some embodiments, be performed by virtualized runtime environment 140 and vice versa. Additionally, functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of examples that follow. Finally, structures and functionality presented as discrete components in the exemplary configurations may be implemented as a combined structure or component.

Although the embodiments above have been described in detail, numerous variations and modifications will become apparent once the above disclosure is fully appreciated. It is intended that the following claims be interpreted to embrace all such variations and modifications.

What is claimed is:

1. A non-transitory, computer-readable storage medium storing program instructions that when executed on a computing device cause the computing device to perform:
   partially specializing a generic class within a platform independent, object oriented runtime environment, wherein the generic class comprises a plurality of specializable type variables, wherein each of the plurality of specializable type variables are specializable over a plurality of type parameterizations; and
   wherein to partially specialize the generic class, the program instructions further cause the computing device to perform:
      specializing the generic class for a particular type variable of the plurality of specializable type variables over a particular type parameterization of the plurality of type parameterizations, without specializing the generic class for at least one other of the plurality of specializable type variables, such that the partially specialized generic class is further specializable for the at least one other specializable type variable over each of the plurality of type parameterizations.

2. The non-transitory, computer-readable storage medium of claim 1, wherein the program instructions further cause the computing device to perform:
   further specializing, subsequent to said partially specializing, the partially specialized generic class for the at least one other of the plurality of specializable type variables over another of the plurality of type parameterizations such that the partially specialized generic class becomes fully specialized as a result of said further specializing.

3. The non-transitory, computer-readable storage medium of claim 1, wherein to partially specialize the generic class, the program instructions further cause the computing device to perform:
   specializing the generic class for a particular type variable of the plurality of specializable type variables over multiple ones of the plurality of type parameterizations, without specializing the generic class for at least one other of the plurality of specializable type variables over any of the plurality of type parameterizations.

4. The non-transitory, computer-readable storage medium of claim 1, wherein the program instructions further cause the computing device to perform:
   loading a class file comprising specialization metadata describing the plurality of specializable type variables;
   partially specializing the metadata such that the partially specialized metadata includes information describing that the partially specialized generic class was specialized for the particular type variable over the particular type parameterization; and
   storing the partially specialized metadata in a classfile corresponding to the partially specialized generic class.

5. The non-transitory, computer-readable storage medium of claim 1, wherein the program instructions further cause the computing device to perform:
   determining a dependency relationship between the generic class and another generic class; and
   specializing, in response to partially specializing the generic class, the other generic class.

6. The non-transitory, computer-readable storage medium of claim 1, wherein the program instructions further cause the computing device to perform:
   determining a refinement method of the generic class that overrides another method of the generic class, wherein the refinement method corresponds to the particular type parameterization;
   including the refinement method in the partially specialized generic class; and
   not including the other method of the generic class in the partially specialized generic class.

7. The non-transitory, computer-readable storage medium of claim 1, wherein the program instructions further cause the computing device to perform:
   determining an additional method of the generic class that corresponds to the particular type parameterization; and
   including the additional method in the partially specialized generic class.

8. A method, comprising:
   partially specializing, by a platform-independent, object-oriented, runtime environment implemented on one or more computing devices, a generic class within a platform independent, object oriented runtime environment, wherein the generic class comprises a plurality of specializable type variables, wherein each of the plurality of specializable type variables are specializable over a plurality of type parameterizations; and
   wherein said partially specializing comprises:
      specializing, by the platform-independent, object-oriented, runtime environment, the generic class for a particular type variable of the plurality of specializable type variables over a particular type parameterization of the plurality of type parameterizations, without specializing the generic class for at least one other of the plurality of specializable type variables, such that the partially specialized generic class is further specializable for the at least one other specializable type variable over each of the plurality of type parameterizations.

9. The method of claim 8, further comprising:
further specializing, subsequent to said partially specializing, the partially specialized generic class for the at least one other of the plurality of specializable type variables over another of the plurality of type parameterizations such that the partially specialized generic class becomes fully specialized as a result of said further specializing.

10. The method of claim 8, wherein said partially specializing the generic class comprises:
specializing the generic class for a particular type variable of the plurality of specializable type variables over multiple ones of the plurality of type parameterizations, without specializing the generic class for at least one other of the plurality of specializable type variables over any of the plurality of type parameterizations.

11. The method of claim 8, further comprising:
loading a class file comprising specialization metadata describing the plurality of specializable type variables;
partially specializing the metadata such that the partially specialized metadata includes information describing that the partially specialized generic class was specialized for the particular type variable over the particular type parameterization; and
storing the partially specialized metadata in a classfile corresponding to the partially specialized generic class.

12. The method claim 8, further comprising:
determining a dependency relationship between the generic class and another generic class; and
specializing, in response to partially specializing the generic class, the other generic class.

13. The method claim 8, further comprising:
determining a refinement method of the generic class that overrides another method of the generic class, wherein the refinement method corresponds to the particular type parameterization; and
including the refinement method in the partially specialized generic class; and
not including the other method of the generic class in the partially specialized generic class.

14. The method of claim 8, further comprising:
determining an additional method of the generic class that corresponds to the particular type parameterization; and
including the additional method in the partially specialized generic class.

15. A computing device, comprising:
a processor; and
a memory comprising program instructions, that when executed on the processor cause the processor to:
partially specialize a generic class within a platform independent, object oriented runtime environment, wherein the generic class comprises a plurality of specializable type variables, wherein each of the plurality of specializable type variables are specializable over a plurality of type parameterizations; and
wherein to partially specialize the generic class, the program instructions further cause the processor to:
specialize the generic class for a particular type variable of the plurality of specializable type variables over a particular type parameterization of the plurality of type parameterizations, without specializing the generic class for at least one other of the plurality of specializable type variables, such that the partially specialized generic class is further specializable for the at least one other specializable type variable over each of the plurality of type parameterizations.

16. The computing device of claim 15, wherein the program instructions further cause the processor to:
further specialize, subsequent to said partially specializing, the partially specialized generic class for the at least one other of the plurality of specializable type variables over another of the plurality of type parameterizations such that the partially specialized generic class becomes fully specialized as a result of said further specializing.

17. The computing device of claim 15, wherein to partially specialize the generic class, the program instructions further cause the processor to:
specialize the generic class for a particular type variable of the plurality of specializable type variables over multiple ones of the plurality of type parameterizations, without specializing the generic class for at least one other of the plurality of specializable type variables over any of the plurality of type parameterizations.

18. The computing device of claim 15, wherein the program instructions further cause the processor to:
load a class file comprising specialization metadata describing the plurality of specializable type variables;
partially specialize the metadata such that the partially specialized metadata includes information describing that the partially specialized generic class was specialized for the particular type variable over the particular type parameterization; and
store the partially specialized metadata in a classfile corresponding to the partially specialized generic class.

19. The computing device of claim 15, wherein the program instructions further cause the processor to:
determine a dependency relationship between the generic class and another generic class; and
specialize, in response to partially specializing the generic class, the other generic class.

20. The computing device of claim 15, wherein the program instructions further cause the processor to:
determine a refinement method of the generic class that overrides another method of the generic class, wherein the refinement method corresponds to the particular type parameterization;
include the refinement method in the partially specialized generic class; and
not include the other method of the generic class in the partially specialized generic class.

* * * * *

UNITED STATES PATENT AND TRADEMARK OFFICE
CERTIFICATE OF CORRECTION

PATENT NO.       : 9,524,152 B2
APPLICATION NO.  : 14/692592
DATED            : December 20, 2016
INVENTOR(S)      : Goetz et al.

It is certified that error appears in the above-identified patent and that said Letters Patent is hereby corrected as shown below:

On the Title Page

Item (56)

On page 2, Column 1, under Other Publications, Line 2, delete "sowftware" and insert -- software --, therefor.

On page 2, Column 2, under Other Publications, Line 42, delete "Gererics" and insert -- Generics --, therefor.

In the Specification

In Column 9, Line 51, delete """ """ and insert -- "()" --, therefor.

In Column 10, Line 61, delete "between between" and insert -- between --, therefor.

In Column 20, Line 21, delete "declaralation" and insert -- declaration --, therefor.

In Column 22, Line 38, delete "()methods" and insert -- () methods --, therefor.

In the Claims

In Column 31, Line 28, in Claim 12, after "method" insert -- of --.

In Column 31, Line 33, in Claim 13, after "method" insert -- of --.

In Column 31, Line 42, in Claim 14, after "method" insert -- of --.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*